US012718357B2

(12) United States Patent
Wang

(10) Patent No.: US 12,718,357 B2
(45) Date of Patent: Aug. 25, 2026

(54) SYSTEMS AND METHODS FOR IMAGE EVALUATION

(71) Applicant: SHANGHAI UNITED IMAGING HEALTHCARE CO., LTD., Shanghai (CN)

(72) Inventor: Xu Wang, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 760 days.

(21) Appl. No.: 17/931,899

(22) Filed: Sep. 13, 2022

(65) Prior Publication Data

US 2023/0083657 A1 Mar. 16, 2023

(30) Foreign Application Priority Data

Sep. 13, 2021 (CN) ......................... 202111070624.7

(51) Int. Cl.
*G06T 7/00* (2017.01)
*G06T 7/70* (2017.01)

(52) U.S. Cl.
CPC .............. *G06T 7/0012* (2013.01); *G06T 7/70* (2017.01); *G06T 2207/20081* (2013.01); *G06T 2207/20084* (2013.01); *G06T 2207/30016* (2013.01)

(58) Field of Classification Search
CPC ................................ G06T 7/0012; G06T 7/70
See application file for complete search history.

(56) References Cited

U.S. PATENT DOCUMENTS 11,519,714 B2* 12/2022 Yoo ......................... G06T 17/00
2011/0142316 A1 6/2011 Wang et al.
2014/0109184 A1* 4/2014 Parker, II ............. H04L 49/252 726/3
2015/0173715 A1 6/2015 Raghavan et al.
2018/0283882 A1* 10/2018 He ......................... H04L 67/30
2019/0192880 A1 6/2019 Hibbard
(Continued)

FOREIGN PATENT DOCUMENTS

CN 104424385 A 3/2015
CN 108665460 A 10/2018
CN 108898060 A 11/2018
(Continued)

OTHER PUBLICATIONS

The Extended European Search Report in European Application No. 22195477.9 mailed on Jan. 23, 2023, 10 pages.
(Continued)

*Primary Examiner* — Kevin Ky
(74) *Attorney, Agent, or Firm* — METIS IP LLC

(57) ABSTRACT

The present disclosure is related to systems and methods for image evaluation. The method may include obtaining an original image including a representation of at least one subject. The method may include generating a plurality of target positioning results for each of the at least one subject by inputting the original image into a prediction model. The prediction model may include a plurality of branches. Each of the plurality of target positioning results may correspond to a branch of the plurality of branches. The method may include determining an evaluation result corresponding to the original image based on the plurality of target positioning results.

20 Claims, 12 Drawing Sheets

(56) References Cited

U.S. PATENT DOCUMENTS

| | | | | |
|---|---|---|---|---|
| 2020/0258243 | A1* | 8/2020 | Chang | A61B 5/107 |
| 2021/0142479 | A1* | 5/2021 | Phogat | G06T 7/11 |

FOREIGN PATENT DOCUMENTS

| | | | |
|---|---|---|---|
| CN | 109919912 | A | 6/2019 |
| CN | 111640126 | A | 9/2020 |
| CN | 112364843 | A | 2/2021 |
| EP | 3404666 | A2 | 11/2018 |

OTHER PUBLICATIONS

Christian Rupprecht et al., Learning in an Uncertain World: Representing Ambiguity Through Multiple Hypotheses, 2017 IEEE International Conference on Computer Vision, 3591-3600, 2017.
Ren, Jingmou et al., The two-dimensional convolution network based on non module automatic classification for reduction of false positivity in pulmonary module detection, Beijing Biomedical Engineering, 39(4): 389-397, 2020.
First Office Action in Chinese Application No. 202111070624.7 mailed on Dec. 27, 2023, 14 pages.

* cited by examiner

500

900A

900B

1001

1002

SYSTEMS AND METHODS FOR IMAGE EVALUATION

CROSS-REFERENCE TO RELATED APPLICATIONS

This application claims priority of Chinese Patent Application No. 202111070624.7, filed on Sep. 13, 2021, and the contents of which are hereby incorporated by reference.

TECHNICAL FIELD

This disclosure generally relates to systems and methods for medical imaging, and more particularly, relates to systems and methods for image evaluation.

BACKGROUND

Medical imaging, such as computed tomography (CT) and magnetic resonance imaging (MRI) technologies, are widely used in disease diagnosis and/or treatment for various medical diseases/conditions (e.g., tumors, coronary heart diseases, brain diseases). Generally, scanning control information (e.g., a scan direction, a scan range) of a subject (e.g., a patient) may be determined based on a positioning result for the subject in an original image acquired by the medical device, thereby facilitating additional scans. The accuracy and efficiency of the subsequent scans of the subject relies on the precision of the positioning result for the subject in the original image. Therefore, it is desirable to provide systems and methods for evaluating a positioning result for a subject in a medical image, thereby improving the accuracy and/or efficiency of medical analysis and/or diagnosis.

SUMMARY

According to an aspect of the present disclosure, a method for image evaluation may be implemented on a computing device including at least one processor and at least one storage device. The method may include obtaining an original image including a representation of at least one subject. The method may include generating a plurality of target positioning results for each of the at least one subject by inputting the original image into a prediction model. The prediction model may include a plurality of branches. Each of the plurality of target positioning results may correspond to a branch of the plurality of branches. The method may include determining an evaluation result corresponding to the original image based on the plurality of target positioning results.

In some embodiments, the prediction model may include a plurality of prediction layers. Each prediction layer of the plurality of prediction layers may include a plurality of blocks. A count of the plurality of blocks in the each prediction layer may be equal to a count of the plurality of branches of the prediction model.

In some embodiments, the method may include, for each branch of the plurality of branches, determining a candidate positioning result corresponding to each block of a plurality of blocks of a plurality of prediction layers of the branch by inputting the original image into the prediction model. The method may include determining a target positioning result by processing a plurality of candidate positioning results corresponding to the plurality of blocks.

In some embodiments, the target positioning result may be a heat map. The method may include determining a plurality of variance maps based on a plurality of heat maps. The method may include determining a plurality of average values based on the plurality of variance maps. The method may include determining a Gaussian distribution based on plurality of average values. The method may include determining the evaluation result based on the Gaussian distribution.

In some embodiments, the prediction model may be generated by a process. The process may include obtaining a preliminary model including a plurality of preliminary branches. Each of the plurality of preliminary branches may correspond to a weight. The process may include obtaining a plurality of groups of training samples. Each group of the plurality of groups of training samples may include a sample input image and a reference positioning result. The process may include generating the prediction model by training the preliminary model with the plurality of groups of training samples.

In some embodiments, the generating the prediction model by training the preliminary model may include performing an iterative process. In at least one of one or more iterations in the iterative process, the method may include obtaining an updated preliminary model generated in a previous iteration. The method may include generating a plurality of sample positioning results by inputting a sample input image of a group of training samples into the updated preliminary model. The method may include determining a plurality of candidate loss function values corresponding to the plurality of preliminary branches of the updated preliminary model based on the plurality of sample positioning results and the reference positioning result of the group of training samples. The method may include determining a target loss function value based on the plurality of candidate loss function values and weights corresponding to the plurality of preliminary branches of the updated preliminary model. The method may include determining whether the target loss function value satisfies a condition. The method may include in response to determining that the target loss function value does not satisfy the condition, updating the updated preliminary model by updating at least some of the parameter values of the updated preliminary model. The method may include adjusting the weights corresponding to the plurality of preliminary branches of the updated preliminary model based on the plurality of candidate loss function values corresponding to the plurality of preliminary branches of the updated preliminary model.

In some embodiments, the method may include in response to determining that the target loss function value satisfies the condition, designating the updated preliminary model as the prediction model.

In some embodiments, the method may include determining a penalty item based on the plurality of sample positioning results corresponding to the plurality of preliminary branches and a count of the plurality of preliminary branches. The method may include determining the target loss function value based on the plurality of candidate loss function values, the weights corresponding to the plurality of preliminary branches of the updated preliminary model, and the penalty item.

In some embodiments, at least two blocks between adjacent prediction layers of the prediction model may be not connected.

According to another aspect of the present disclosure, a method for medical imaging may be implemented on a computing device including at least one processor and at least one storage device. The method may include obtaining an original image acquired by a medical device. The original image may include a representation of a subject. The method may include determining at least one target positioning result of the subject and an evaluation result corresponding to the original image. The method may include generating the at least one target positioning result of the subject by inputting the original image into a prediction model. The prediction model may include a plurality of branches. Each of the at least one target positioning result may correspond to a branch of the plurality of branches. The method may include determining the evaluation result corresponding to the original image based on the at least one target positioning result. The method may include displaying the at least one target positioning result of the subject and the evaluation result corresponding to the original image.

In some embodiments, the method may include, in response to determining that the evaluation result satisfies a condition, generating scanning control information of the subject based on the at least one target positioning result. The scanning control information may be used to guide the medical device to scan the subject.

In some embodiments, the method may include, in response to determining that the evaluation result does not satisfy a condition, generating a reminder. The method may include displaying the original image. The method may include receiving correction information associated with the at least one target positioning result from a user. The method may include generating scanning control information of the subject based on the correction information and the at least one target positioning result.

In some embodiments, the method may include storing the correction information in the at least one storage device.

In some embodiments, the method may include determining whether there is correction information corresponding to the original image. The method may include, in response to determining that there is the correction information corresponding to the original image, correcting the at least one target positioning result based on the correction information.

According to another aspect of the present disclosure, a system for image evaluation may include at least one storage medium including a set of instructions, and at least one processor in communication with the at least one storage medium. When executing the set of instructions, the at least one processor may be directed to cause the system to perform a method. The method may include obtaining an original image including a representation of at least one subject. The method may include generating a plurality of target positioning results for each of the at least one subject by inputting the original image into a prediction model. The prediction model may include a plurality of branches. Each of the plurality of target positioning results may correspond to a branch of the plurality of branches. The method may include determining an evaluation result corresponding to the original image based on the plurality of target positioning results.

According to another aspect of the present disclosure, a system may include at least one storage medium including a set of instructions, and at least one processor in communication with the at least one storage medium. When executing the set of instructions, the at least one processor may be directed to cause the system to perform a method. The method may include obtaining an original image acquired by a medical device. The original image may include a representation of a subject. The method may include determining at least one target positioning result of the subject and an evaluation result corresponding to the original image. The method may include generating the at least one target positioning result of the subject by inputting the original image into a prediction model. The prediction model may include a plurality of branches. Each of the at least one target positioning result may correspond to a branch of the plurality of branches. The method may include determining the evaluation result corresponding to the original image based on the at least one target positioning result. The method may include displaying the at least one target positioning result of the subject and the evaluation result corresponding to the original image.

According to another aspect of the present disclosure, a non-transitory computer readable medium may include at least one set of instructions. When executed by at least one processor of a computing device, the at least one set of instructions may cause the at least one processor to effectuate a method. The method may include obtaining an original image including a representation of at least one subject. The method may include generating a plurality of target positioning results for each of the at least one subject by inputting the original image into a prediction model. The prediction model may include a plurality of branches. Each of the plurality of target positioning results may correspond to a branch of the plurality of branches. The method may include determining an evaluation result corresponding to the original image based on the plurality of target positioning results.

According to another aspect of the present disclosure, a non-transitory computer readable medium may include at least one set of instructions. When executed by at least one processor of a computing device, the at least one set of instructions may cause the at least one processor to effectuate a method. The method may include obtaining an original image acquired by a medical device. The original image may include a representation of a subject. The method may include determining at least one target positioning result of the subject and an evaluation result corresponding to the original image. The method may include generating the at least one target positioning result of the subject by inputting the original image into a prediction model. The prediction model may include a plurality of branches. Each of the at least one target positioning result may correspond to a branch of the plurality of branches. The method may include determining the evaluation result corresponding to the original image based on the at least one target positioning result. The method may include displaying the at least one target positioning result of the subject and the evaluation result corresponding to the original image.

According to another aspect of the present disclosure, a system may include an obtaining module, a generation module, and a determination module. The obtaining module may be configured to obtain an original image including a representation of at least one subject. The generation module may be configured to generate a plurality of target positioning results for each of the at least one subject by inputting the original image into a prediction model. The prediction model may include a plurality of branches. Each of the plurality of target positioning results may correspond to a branch of the plurality of branches. The determination module may be configured to determine an evaluation result corresponding to the original image based on the plurality of target positioning results.

According to another aspect of the present disclosure, a system may include an obtaining module and a determination module. The obtaining module may be configured to obtain an original image acquired by a medical device. The original image may include a representation of a subject. The determination module may be configured to determine at least one target positioning result of the subject and an evaluation result corresponding to the original image. The determination module may be configured to display the at least one target positioning result of the subject and the evaluation result corresponding to the original image.

According to another aspect of the present disclosure, a device may include at least one storage medium including a set of instructions, and at least one processor in communication with the at least one storage medium. When executing the set of instructions, the at least one processor may be directed to cause the device to perform a method. The method may include obtaining an original image including a representation of at least one subject. The method may include generating a plurality of target positioning results for each of the at least one subject by inputting the original image into a prediction model. The prediction model may include a plurality of branches. Each of the plurality of target positioning results may correspond to a branch of the plurality of branches. The method may include determining an evaluation result corresponding to the original image based on the plurality of target positioning results.

According to another aspect of the present disclosure, a device may include at least one storage medium including a set of instructions, and at least one processor in communication with the at least one storage medium. When executing the set of instructions, the at least one processor may be directed to cause the device to perform a method. The method may include obtaining an original image acquired by a medical device. The original image may include a representation of a subject. The method may include determining at least one target positioning result of the subject and an evaluation result corresponding to the original image. The method may include generating the at least one target positioning result of the subject by inputting the original image into a prediction model. The prediction model may include a plurality of branches. Each of the at least one target positioning result may correspond to a branch of the plurality of branches. The method may include determining the evaluation result corresponding to the original image based on the at least one target positioning result. The method may include displaying the at least one target positioning result of the subject and the evaluation result corresponding to the original image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
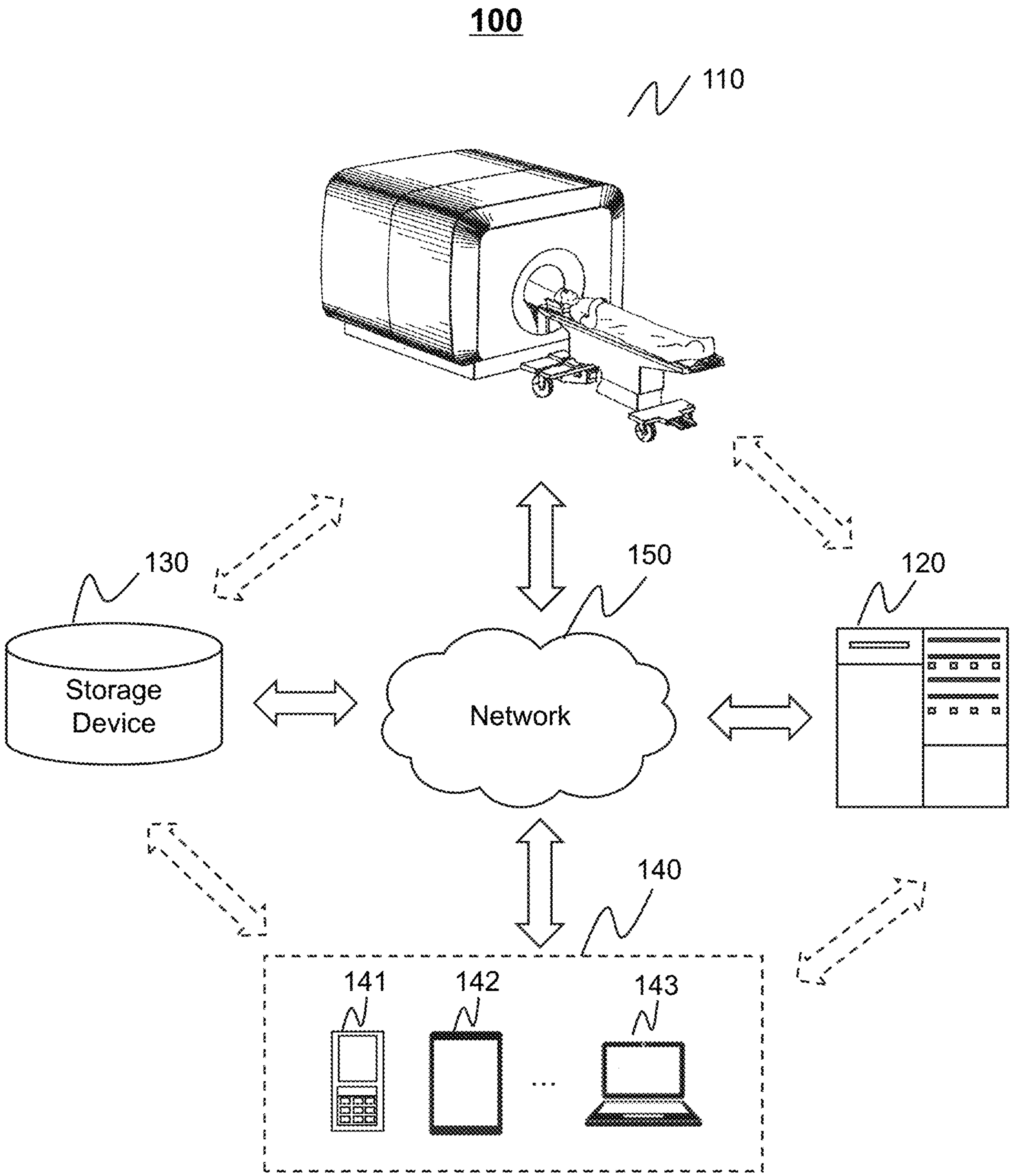
FIG. 1 is a schematic diagram illustrating an exemplary medical system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Also, the term "exemplary" is intended to refer to an example or illustration.

It will be understood that the terms "system," "engine," "unit," "module," and/or "block" used herein are one method to distinguish different components, elements, parts, sections or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

Spatial and functional relationships between elements are described using various terms, including "connected," "attached," and "mounted." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, attached, or positioned to another element, there are no intervening elements present. Other words used to describe the relationship between elements should be interpreted in a like fashion (e.g., "between," versus "directly between," "adjacent," versus "directly adjacent," etc.).

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The term "image" in the present disclosure is used to collectively refer to image data (e.g., scan data, projection data) and/or images of various forms, including a two-dimensional (2D) image, a three-dimensional (3D) image, a four-dimensional (4D), etc. The term "anatomical structure" in the present disclosure may refer to gas (e.g., air), liquid (e.g., water), solid (e.g., stone), cell, tissue, organ of a subject, or any combination thereof, which may be displayed in an image and really exist in or on the subject's body. The term "region," "location," and "area" in the present disclosure may refer to a location of an anatomical structure shown in the image or an actual location of the anatomical structure existing in or on the subject's body, since the image may indicate the actual location of a certain anatomical structure existing in or on the subject's body. The term "an image of a subject" may be referred to as the subject for brevity.

An aspect of the present disclosure relates to systems and methods for slice positioning and image reconstruction. According to some embodiments of the present disclosure, a processing device may obtain an original image including a representation of at least one subject. The processing device may generate a plurality of target positioning results for each of the at least one subject by inputting the original image into a prediction model. The prediction model may include a plurality of branches. Each of the plurality of target positioning results may correspond to a branch of the plurality of branches. The processing device may determine an evaluation result corresponding to the original image based on the plurality of target positioning results.

According to some embodiments of the present disclosure, the plurality of target positioning results for each of the at least one subject may be generated by inputting the original image into the prediction model, and the evaluation result corresponding to the original image may be determined based on the plurality of target positioning results. Therefore, the image evaluation methods and systems disclosed herein can improve the accuracy and efficiency of the image evaluation and scan preparation by, e.g., reducing the workload of a user, cross-user variations, and the time needed for the image processing.

FIG. 1 is a schematic diagram illustrating an exemplary medical system according to some embodiments of the present disclosure. As illustrated, a medical system 100 may include a medical device 110, a processing device 120, a storage device 130, a terminal 140, and a network 150. The components of the medical system 100 may be connected in one or more of various ways. Merely by way of example, as illustrated in FIG. 1, the medical device 110 may be connected to the processing device 120 directly as indicated by the bi-directional arrow in dotted lines linking the medical device 110 and the processing device 120, or through the network 150. As another example, the storage device 130 may be connected to the medical device 110 directly as indicated by the bi-directional arrow in dotted lines linking the medical device 110 and the storage device 130, or through the network 150. As still another example, the terminal 140 may be connected to the processing device 120 directly as indicated by the bi-directional arrow in dotted lines linking the terminal 140 and the processing device 120, or through the network 150.

The medical device 110 may be configured to acquire imaging data relating to a subject. The imaging data relating to a subject may include an image (e.g., an image slice), projection data, or a combination thereof. In some embodiments, the imaging data may be a two-dimensional (2D) imaging data, a three-dimensional (3D) imaging data, a four-dimensional (4D) imaging data, or the like, or any combination thereof. The subject may be biological or non-biological. For example, the subject may include a patient, a man-made object, etc. As another example, the subject may include a specific portion, an organ, and/or tissue of the patient. Specifically, the subject may include the head, the neck, the thorax, the heart, the stomach, a blood vessel, soft tissue, a tumor, or the like, or any combination thereof.

In some embodiments, the medical device 110 may include a single modality imaging device. For example, the medical device 110 may include a positron emission tomography (PET) device, a single-photon emission computed tomography (SPECT) device, a magnetic resonance imaging (MRI) device, a computed tomography (CT) device, an ultrasound (US) device, an X-ray imaging device, or the like, or any combination thereof. In some embodiments, the medical device 110 may include a multi-modality imaging device. Exemplary multi-modality imaging devices may include a PET-CT device, a PET-MRI device, a SPET-CT device, or the like, or any combination thereof. The multi-modality imaging device may perform multi-modality imaging simultaneously. For example, the PET-CT device may generate structural X-ray CT data and functional PET data simultaneously in a single scan. The PET-MRI device may generate MRI data and PET data simultaneously in a single scan.

The processing device 120 may process data and/or information obtained from the medical device 110, the storage device 130, and/or the terminal(s) 140. For example, the processing device 120 may obtain an original image including a representation of at least one subject. As another example, the processing device 120 may generate a plurality of target positioning results for a subject by inputting an original image into a prediction model. As another example, the processing device 120 may determine an evaluation result corresponding to an original image based on a plurality of target positioning results. In some embodiments, the processing device 120 may be a single server or a server group. The server group may be centralized or distributed. In some embodiments, the processing device 120 may be local or remote. For example, the processing device 120 may access information and/or data from the medical device 110, the storage device 130, and/or the terminal(s) 140 via the network 150. As another example, the processing device 120 may be directly connected to the medical device 110, the terminal(s) 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be part of the terminal 140. In some embodiments, the processing device 120 may be part of the medical device 110.

The storage device 130 may store data, instructions, and/or any other information. In some embodiments, the storage device 130 may store data obtained from the medical device 110, the processing device 120, and/or the terminal(s) 140. The data may include image data acquired by the processing device 120, algorithms and/or models for processing the image data, etc. For example, the storage device 130 may store an original image of a subject acquired by a medical device. As another example, the storage device 130 may store a prediction model determined by the processing device 120. As another example, the storage device 130 may store an evaluation result determined by the processing device 120. In some embodiments, the storage device 130 may store data and/or instructions that the processing device 120 and/or the terminal 140 may execute or use to perform exemplary methods described in the present disclosure. In some embodiments, the storage device 130 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), a high-speed RAM, etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the medical system 100 (e.g., the processing device 120, the terminal(s) 140). One or more components in the medical system 100 may access the data or instructions stored in the storage device 130 via the network 150. In some embodiments, the storage device 130 may be integrated into the medical device 110.

The terminal(s) 140 may be connected to and/or communicate with the medical device 110, the processing device 120, and/or the storage device 130. In some embodiments, the terminal 140 may include a mobile device 141, a tablet computer 142, a laptop computer 143, or the like, or any combination thereof. For example, the mobile device 141 may include a mobile phone, a personal digital assistant (PDA), a gaming device, a navigation device, a point of sale (POS) device, a laptop, a tablet computer, a desktop, or the like, or any combination thereof. In some embodiments, the terminal 140 may include an input device, an output device, etc. The input device may include alphanumeric and other keys that may be input via a keyboard, a touchscreen (for example, with haptics or tactile feedback), a speech input, an eye tracking input, a brain monitoring system, or any other comparable input mechanism. Other types of the input device may include a cursor control device, such as a mouse, a trackball, or cursor direction keys, etc. The output device may include a display, a printer, or the like, or any combination thereof.

The network 150 may include any suitable network that can facilitate the exchange of information and/or data for the medical system 100. In some embodiments, one or more components of the medical system 100 (e.g., the medical device 110, the processing device 120, the storage device 130, the terminal(s) 140, etc.) may communicate information and/or data with one or more other components of the medical system 100 via the network 150. For example, the processing device 120 and/or the terminal 140 may obtain an original image of a subject from the medical device 110 via the network 150. As another example, the processing device 120 and/or the terminal 140 may obtain information stored in the storage device 130 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, witches, server computers, and/or any combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the medical system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure.

Figure 2:
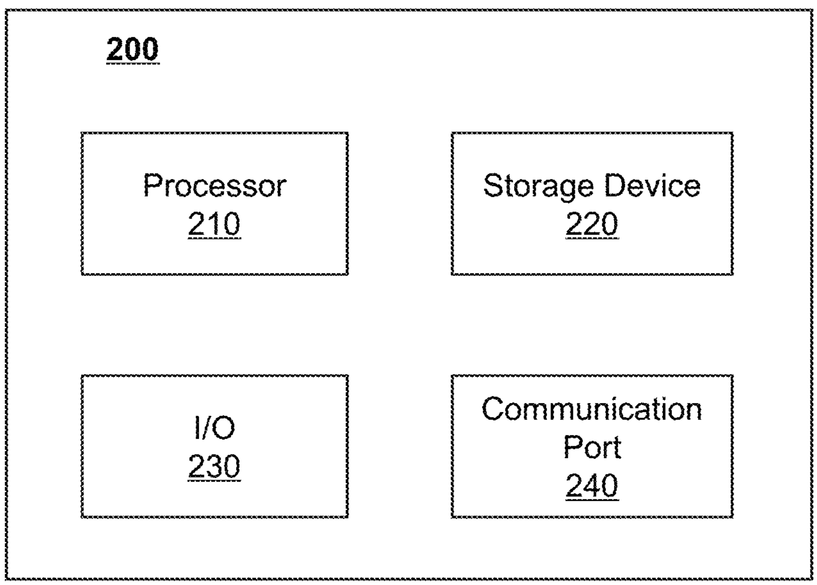
FIG. 2 is a schematic diagram illustrating exemplary hardware and/or software components of an exemplary computing device on which a processing device may be implemented according to some embodiments of the present disclosure.

FIG. 2 is a schematic diagram illustrating exemplary hardware and/or software components of an exemplary computing device on which the processing device 120 may be implemented according to some embodiments of the present disclosure. As illustrated in FIG. 2, a computing device 200 may include a processor 210, a storage device 220, an input/output (I/O) 230, and a communication port 240.

The processor 210 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 210 may process image data obtained from the medical device 110, the terminal 140, the storage device 130, and/or any other component of the medical system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage device 220 may store data/information obtained from the medical device 110, the terminal 140, the storage device 130, and/or any other component of the medical system 100. The storage device 220 may be similar to the storage device 130 described in connection with FIG. 1, and the detailed descriptions are not repeated here.

The I/O 230 may input and/or output signals, data, information, etc. In some embodiments, the I/O 230 may enable a user interaction with the processing device 120. In some embodiments, the I/O 230 may include an input device and an output device. Examples of the input device may include a keyboard, a mouse, a touchscreen, a microphone, a sound recording device, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touchscreen, or the like, or a combination thereof.

The communication port 240 may be connected to a network (e.g., the network 150) to facilitate data communications. The communication port 240 may establish connections between the processing device 120 and the medical device 110, the terminal 140, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. In some embodiments, the communication port 240 may be and/or include a standardized communication port, such as RS232, RS485. In some embodiments, the communication port 240 may be a specially designed communication port. For example, the communication port 240 may be designed in accordance with the digital imaging and communications in medicine (DICOM) protocol.

Figure 3:
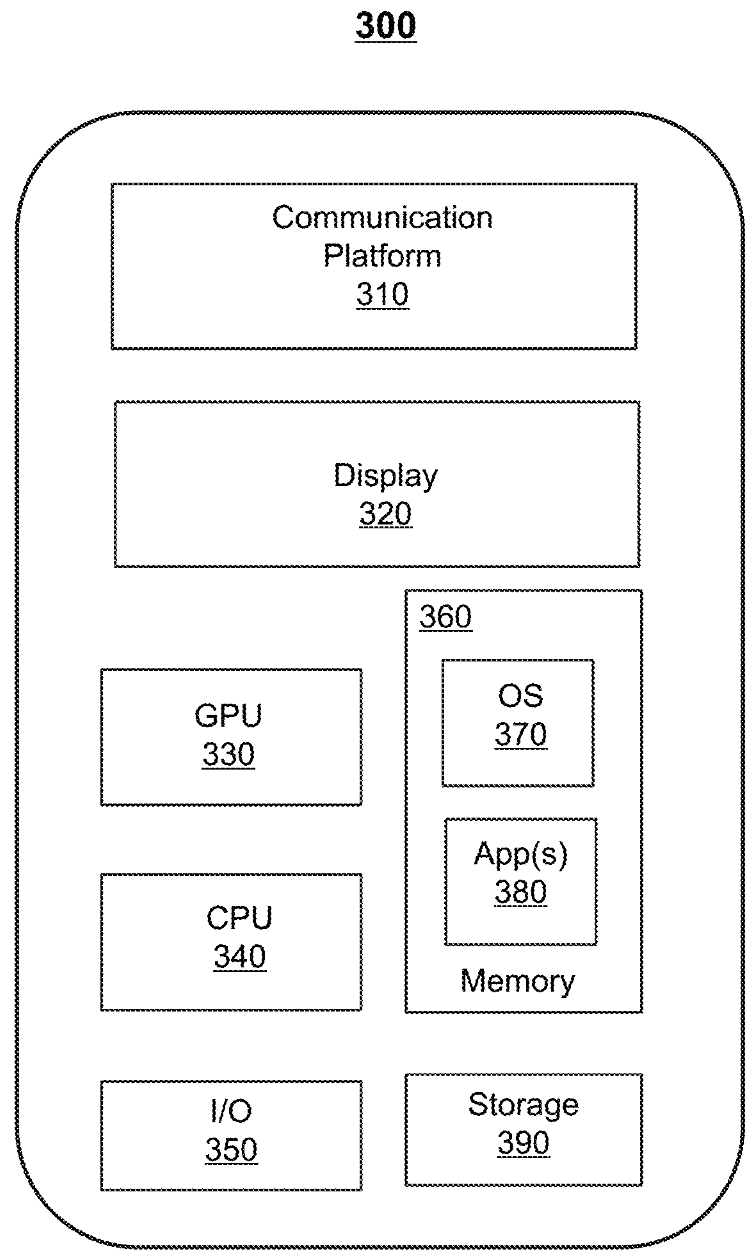
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the terminal 140 and/or the processing device 120 may be implemented on a mobile device 300, respectively.

As illustrated in FIG. 3, the mobile device 300 may include a communication platform 310, a display 320, a graphics processing unit (GPU) 330, a central processing unit (CPU) 340, an I/O 350, a memory 360, and storage 390. In some embodiments, any other suitable component, including but not limited to a system bus or a controller (not shown), may also be included in the mobile device 300.

In some embodiments, the communication platform 310 may be configured to establish a connection between the mobile device 300 and other components of the medical system 100, and enable data and/or signal to be transmitted between the mobile device 300 and other components of the medical system 100. For example, the communication platform 310 may establish a wireless connection between the mobile device 300 and the medical device 110, and/or the processing device 120. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. The communication platform 310 may also enable the data and/or signal between the mobile device 300 and other components of the medical system 100. For example, the communication platform 310 may transmit data and/or signals inputted by a user to other components of the medical system 100. The inputted data and/or signals may include a user instruction. As another example, the communication platform 310 may receive data and/or signals transmitted from the processing device 120. The received data and/or signals may include imaging data acquired by the medical device 110.

In some embodiments, a mobile operating system (OS) 370 (e.g., iOS™ Android™, Windows Phone™, etc.) and one or more applications (App(s)) 380 may be loaded into the memory 360 from the storage 390 in order to be executed by the CPU 340. The applications 380 may include a browser or any other suitable mobile apps for receiving and rendering information from the processing device 120. User interactions with the information stream may be achieved via the I/O 350 and provided to the processing device 120 and/or other components of the medical system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4:
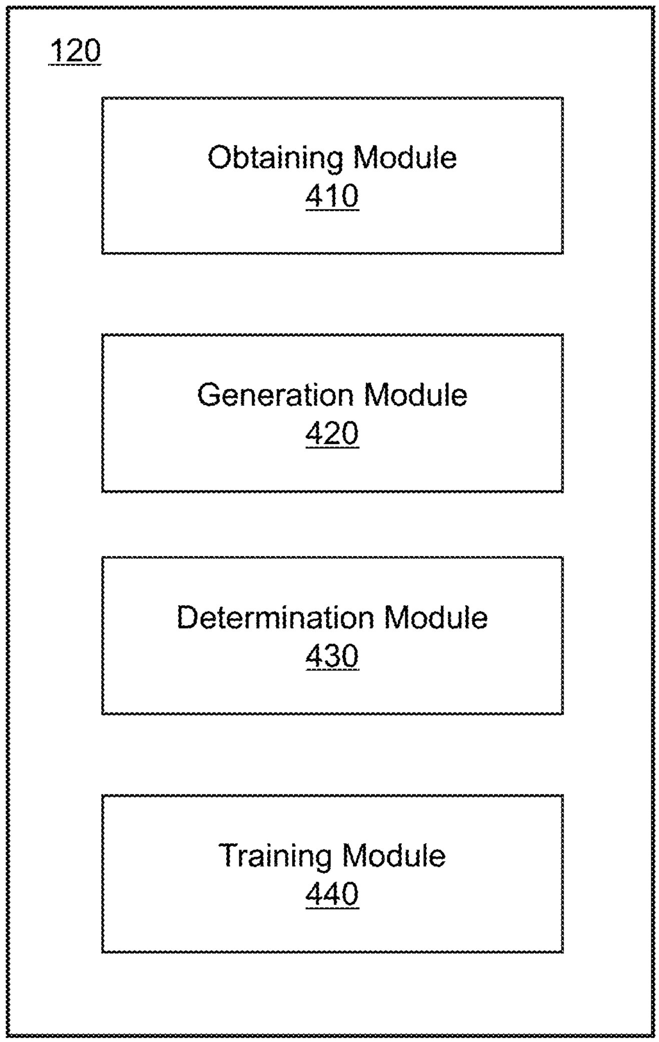
FIG. 4 is a schematic diagram illustrating an exemplary processing device according to some embodiments of the present disclosure.

FIG. 4 is a schematic diagram illustrating an exemplary processing device according to some embodiments of the present disclosure. In some embodiments, the processing device 120 may include an obtaining module 410, a generation module 420, a determination module 430, and a training module 440.

The obtaining module 410 may be configured to obtain data/information associated with the medical system 100. For example, the obtaining module 410 may obtain an original image including a representation of at least one subject. More descriptions of the original image may be found elsewhere in the present disclosure (e.g., operation 510 in FIG. 5 and descriptions thereof). In some embodiments, the obtaining module 410 may obtain the data and/or the information associated with the medical system 100 from one or more components (e.g., the medical device 110, the storage device 130, the terminal 140) of the medical system 100 via the network 150.

The generation module 420 may be configured to generate a plurality of target positioning results for each of at least one subject. In some embodiments, the generation module 420 may generate a plurality of target positioning results for each of at least one subject by inputting an original image into a prediction model. For example, for each branch of a plurality of branches of the prediction model, the generation module 420 may determine a candidate positioning result corresponding to each block of a plurality of blocks of a plurality of prediction layers of the branch by inputting the original image into the prediction model. The generation module 420 may determine a target positioning result by processing a plurality of candidate positioning results corresponding to the plurality of blocks. More descriptions for generating the plurality of target positioning results for the at least one subject may be found elsewhere in the present disclosure (e.g., operation 520 in FIG. 5 and descriptions thereof).

The determination module 430 may be configured to determine an evaluation result corresponding to an original image based on a plurality of target positioning results. For example, the target positioning result may be a heat map. The determination module 430 may determine a plurality of variance maps based on a plurality of heat maps. The determination module 430 may determine a plurality of average values based on the plurality of variance maps. The determination module 430 may determine a Gaussian distribution based on plurality of average values. The determination module 430 may determine the evaluation result based on the Gaussian distribution. More descriptions for determining the evaluation result may be found elsewhere in the present disclosure (e.g., operation 530 in FIG. 5 and descriptions thereof).

The training module 440 may be configured to generate a prediction model. For example, the training module 440 may obtain a preliminary model including a plurality of preliminary branches. The training module 440 may obtain a plurality of groups of training samples. Each group of the plurality of groups of training samples may include a sample input image and a reference positioning result. The training module 440 may generate the prediction model by training the preliminary model with the plurality of groups of training samples. More descriptions for training the prediction model may be found elsewhere in the present disclosure (e.g., FIGS. 6, 7, and descriptions thereof).

It should be noted that the above description of the processing device 120 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more modules may be combined into a single module. For example, the generation module 420 and the determination module 430 may be combined into a single module. In some embodiments, one or more modules may be added or omitted in the processing device 120. For example, the processing device 120 may further include a storage module (not shown in FIG. 4) configured to store data and/or information (e.g., an original image, a plurality of target positioning results, a prediction model, an evaluation result) associated with the medical system 100. As another example, the training module 440 may be omitted.

Figure 5:
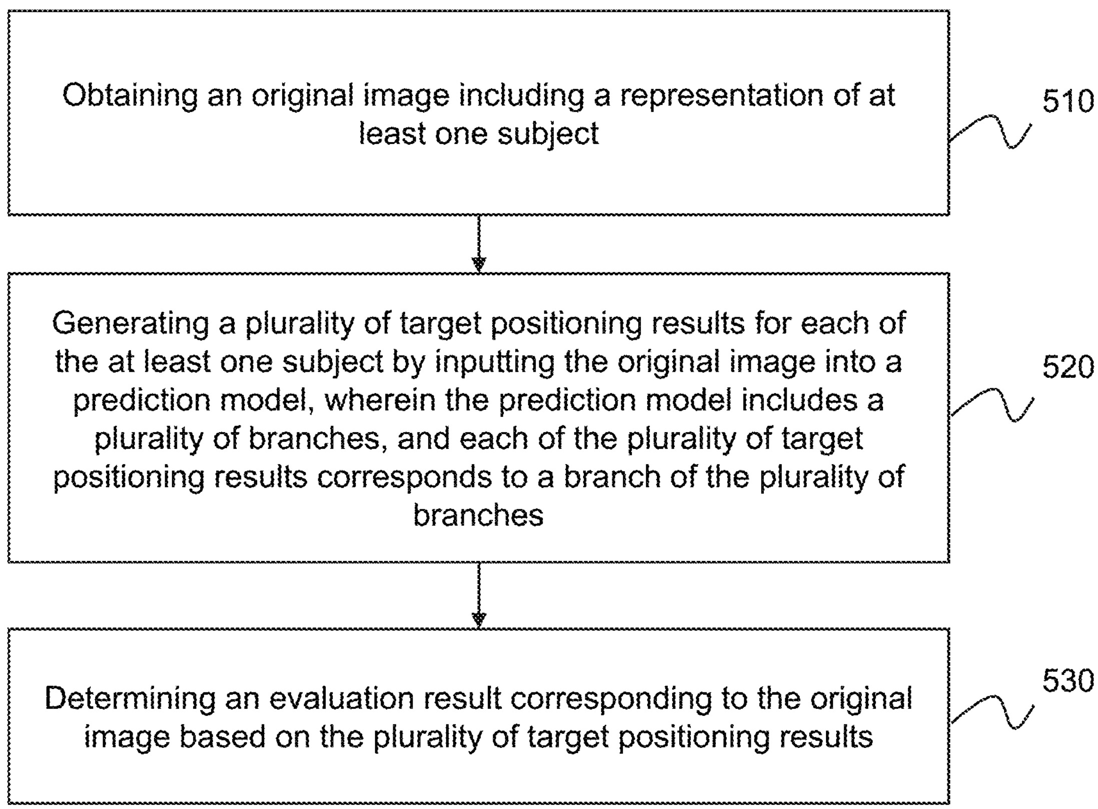
FIG. 5 is a flowchart illustrating an exemplary process for determining an evaluation result according to some embodiments of the present disclosure.

FIG. 5 is a flowchart illustrating an exemplary process for determining an evaluation result according to some embodiments of the present disclosure. In some embodiments, process 500 may be executed by the medical system 100. For example, the process 500 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 120 (e.g., the obtaining module 410) may obtain an original image including a representation of at least one subject.

In some embodiments, the subject may be a specific portion (e.g., the head, the thorax, the abdomen), an organ (e.g., a lung, the liver, the heart, the stomach), and/or tissue (e.g., muscle tissue, connective tissue, epithelial tissue, nervous tissue) of a human or an animal. For example, the subject may be a target scan region of a patient that need to be scanned by a medical device (e.g., the medical device 110). In some embodiments, a representation of a subject in the original image may refer to a portion of the original image that represents the subject. In the present disclosure, "a representation of a subject in an image" may be referred to as "a subject in an image" for brevity.

In some embodiments, the original image may include a CT image, an MRI image, a PET image, a PET-CT image, an MRI-CT image, or the like. The original image may be a two-dimensional (2D) image, a three-dimensional (3D) image, a four-dimensional (4D) image, or the like. In some embodiments, the original image may include a scout image. In some embodiments, the medical device 110 may obtain scan data (e.g., CT scan data) by scanning (e.g., a CT scanning) the at least one subject. The processing device 120 may generate the original image based on the scan data according to one or more reconstruction algorithms (e.g., a filter back projection (FBP) algorithm, a back-projection filter (BFP) algorithm).

In some embodiments, the processing device 120 may obtain the original image from one or more components (e.g., the medical device 110, the terminal 140, the storage device 130) of the medical system 100 or an external storage device via the network 150. For example, the medical device 110 may transmit the original image to the storage device 130, or any other storage device for storage. The processing device 120 may obtain the original image from the storage device 130, or any other storage device. As another example, the processing device 120 may obtain the original image from the medical device 110 directly. In some embodiments, the original image may be acquired by performing an initial scan on the at least one subject. As used herein, an initial scan of a subject refers to that the subject is scanned for the first time. In some embodiments, the original image may be acquired by performing a follow-up scan on the at least one subject. As used herein, a follow-up scan of a subject refers to that the subject is scanned multiple times to track the change of the subject.

In 520, the processing device 120 (e.g., the generation module 420) may generate a plurality of target positioning results for each of the at least one subject by inputting the original image into a prediction model. The prediction model may include a plurality of branches. Each of the plurality of target positioning results may correspond to a branch of the plurality of branches.

Figure 10A:
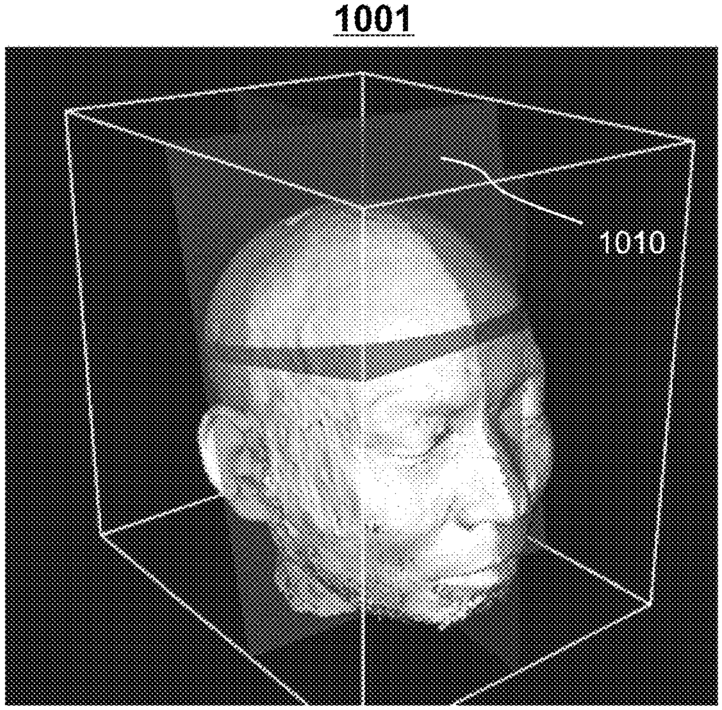
FIGS. 10A and 10B are schematic diagrams illustrating exemplary target positioning results for the head of a patient according to some embodiments of the present disclosure.
Figure 10B:
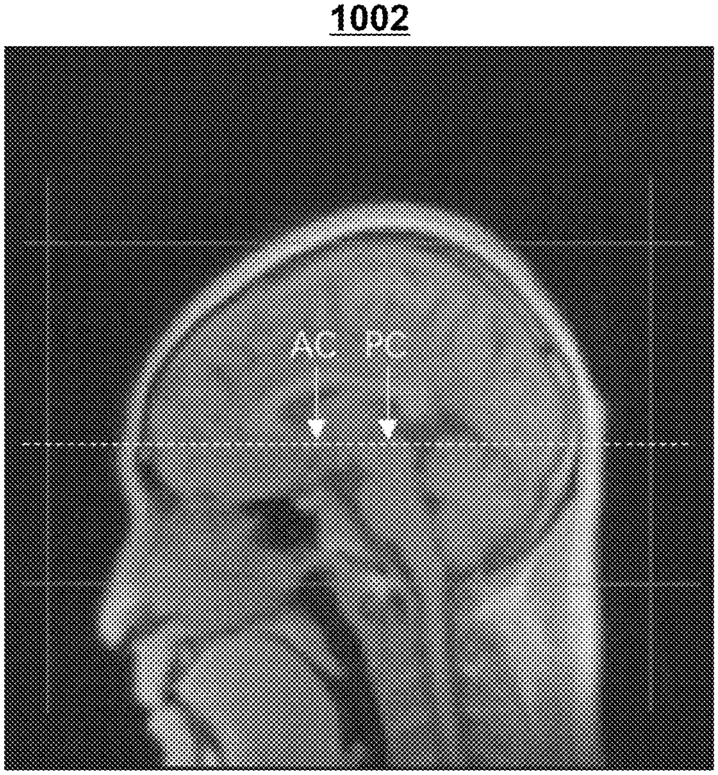

In some embodiments, a target positioning result for a subject may indicate feature information (e.g., a size, a contour, a position) of at least one portion of the subject in the original image. In some embodiments, the target positioning result for the subject may be in a form of a point, a line, a plane, a bounding box, a mask, or the like. For example, the target positioning result for the subject may be a bounding box enclosing the subject in the original image. As another example, the target positioning result for the subject may be a mid-sagittal plane of the subject (e.g., the head) in the original image, as illustrated in FIG. 10A. As still another example, the target positioning result for the subject may be one or more feature points (e.g., a center point) of the subject in the original image, as illustrated in FIG. 10B.

As used herein, a prediction model refers to an algorithm or process configured to determine a plurality of target positioning results for a subject in an image (e.g., the original image). For example, the processing device 120 may input the original image including the representation of the at least one subject into the prediction model. The prediction model may extract image features (e.g., a low-level feature (e.g., an edge feature, a texture feature), a high-level feature (e.g., a semantic feature) of the original image, and output the plurality of target positioning results for each of the at least one subject.

In some embodiments, the prediction model may be constructed based on a convolutional neural network (CNN), a fully convolutional neural network (FCN), a generative adversarial network (GAN), a U-shape network (U-Net), a V-shape network (V-Net), a residual network (ResNet), a dense convolutional network (DenseNet), a deep stacking network, a deep belief network (DBN), a stacked auto-encoders (SAE), a logistic regression (LR) model, a support vector machine (SVM) model, a decision tree model, a naive Bayesian model, a random forest model, a restricted Boltzmann machine (RBM), a gradient boosting decision tree (GBDT) model, a LambdaMART model, an adaptive boosting model, a recurrent neural network (RNN) model, a hidden Markov model, a perceptron neural network model, a Hopfield network model, or the like, or any combination thereof.

In some embodiments, the prediction model may be determined by training a preliminary model using a plurality of groups of training samples. In some embodiments, the processing device 120 may train the preliminary model to generate the prediction model according to a machine learning algorithm. The machine learning algorithm may include an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the prediction model may be a supervised learning algorithm, a semi-supervised learning algorithm, an unsupervised learning algorithm, or the like. More descriptions for determining the prediction model may be found elsewhere in the present disclosure (e.g., FIGS. 6-7, and descriptions thereof).

In some embodiments, the prediction model may be a multiple hypothesis prediction (MHP) model. The multiple hypothesis prediction model may predict a plurality of outputs (e.g., a plurality of target positioning results) based on an input (e.g., the original image). The multiple hypothesis prediction model may perform a multi-branch replication on an output convolutional layer module of a preset neural network structure (e.g., a U-Net, a V-Net) to form a multi-hypothesis prediction mechanism.

In some embodiments, the prediction model may include a plurality of branches. Each branch of the plurality of branches may correspond to a weight. The weights for the plurality of branches may be the same or different. The weights for the plurality of branches may be determined during the training of the prediction model. Each of the plurality of target positioning results may correspond to a branch of the plurality of branches. For example, the processing device 120 may input the original image including the representation of the at least one subject into the prediction model. Each branch of the plurality of branches of the prediction model may output a target positioning result for each of the at least one subject.

Figure 9A:
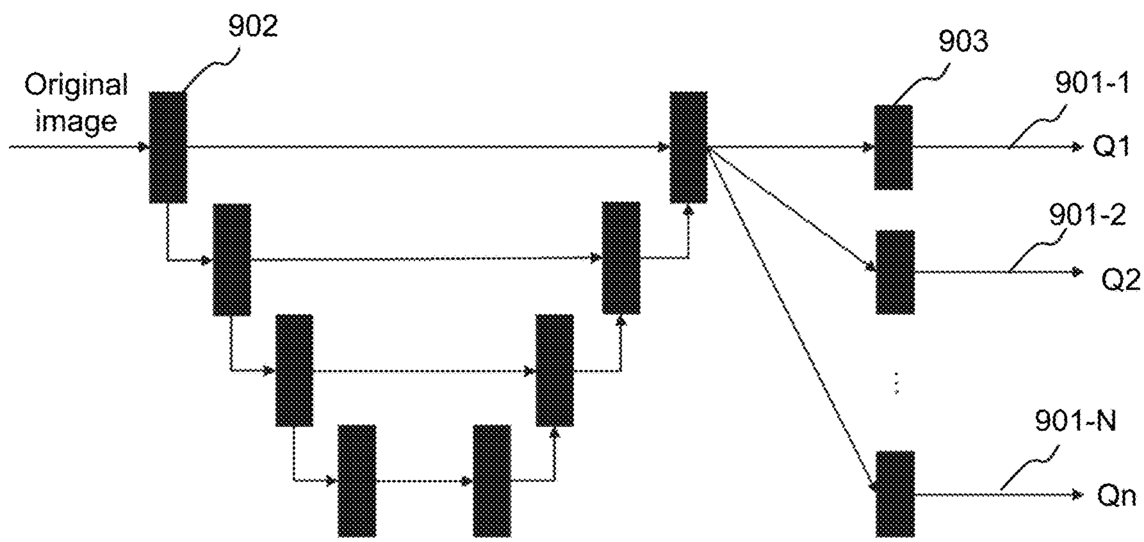
FIG. 9A is a schematic diagram illustrating an exemplary prediction model according to some embodiments of the present disclosure.

FIG. 9A is a schematic diagram illustrating an exemplary prediction model according to some embodiments of the present disclosure. As illustrated in FIG. 9A, a prediction model 900A may include a plurality of branches (e.g., a branch 901-1, a branch 901-2, . . . , a branch 901-N). Each branch of the plurality of branches may include a plurality of blocks. The plurality of blocks may include at least one feature extraction block (e.g., a block 902) and at least one prediction block (e.g., a block 903). An original image including a representation of at least one subject may be input into the plurality of branches of the prediction model 900A. Each branch may output a target positioning result for each of the at least one subject. For example, the branch 901-1 may output an image Q1, the branch 901-2 may output an image Q2, and the branch 901-N may output an image Qn.

Figure 9B:
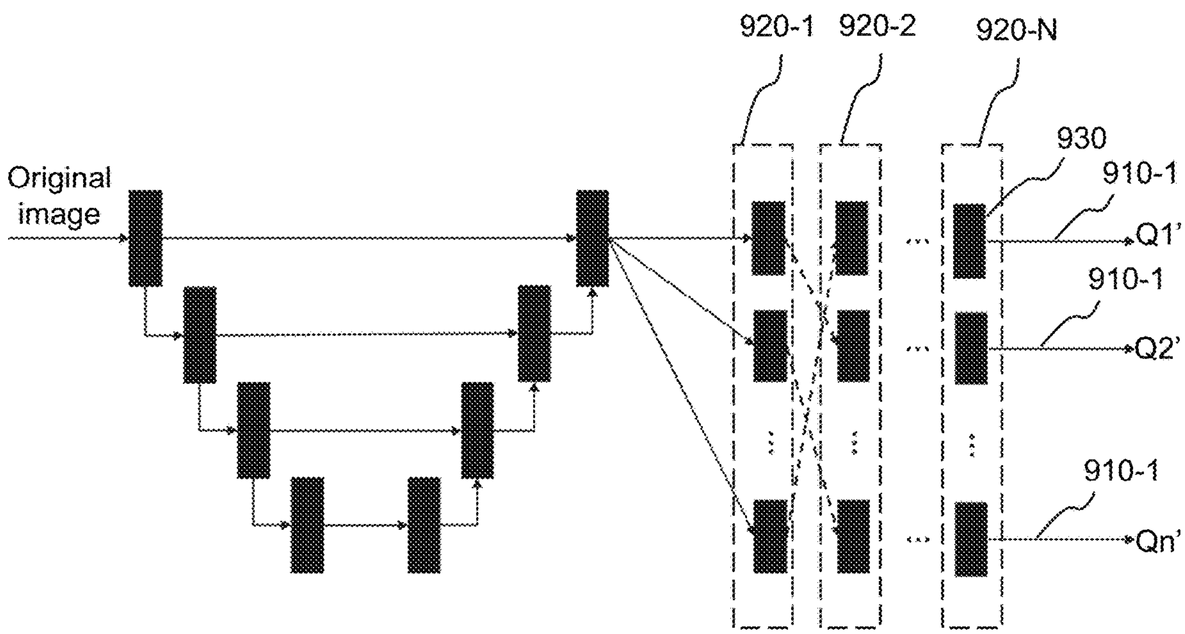
FIG. 9B is a schematic diagram illustrating an exemplary prediction model according to some embodiments of the present disclosure.

In some embodiments, the prediction model may include a plurality of prediction layers. A number (or count) of the prediction layers may be manually set by a user (e.g., a doctor) of the medical system 100, or determined by one or more components of the medical device 110 according to different situations. For example, the number (or count) of the prediction layers may be 2, 3, 5, or the like. Each prediction layer of the plurality of prediction layers may include a plurality of blocks. In some embodiments, a count of the blocks in the each prediction layer may be equal to a count of the branches of the prediction model. In some embodiments, the blocks between two adjacent prediction layers of the prediction model may be fully connected. For example, any two blocks between adjacent prediction layers of the prediction model may be connected. In some embodiments, the blocks between two adjacent prediction layers of the prediction model may be connected randomly, as illustrated in FIG. 9B, which may improve a variability degree (or a confusion degree) of outputs (e.g., a plurality of target positioning results) of the prediction model. For example, at least two blocks between adjacent prediction layers of the prediction model may be not connected. The connection structure of the blocks between two adjacent prediction layers of the prediction model may be manually set by a user (e.g., a doctor) of the medical system 100, or determined by one or more components of the medical device 110 according to different situations.

In some embodiments, the structures of the blocks in a same prediction layer may be the same or different. In some embodiments, the structures of the blocks in different prediction layers may be the same or different. In some embodiments, a connection structure between adjacent blocks in the prediction model may be the same or different.

FIG. 9B is a schematic diagram illustrating an exemplary prediction model according to some embodiments of the present disclosure. As illustrated in FIG. 9B, a prediction model 900B may include a plurality of branches (e.g., a branch 910-1, a branch 910-2, . . . , a branch 910-N). The prediction model 900B may include a plurality of prediction layers (e.g., a prediction layer 920-1, a prediction layer 920-2, . . . , a prediction layer 920-N). The prediction layers may be cascaded. A count of blocks in the each prediction layer may be equal to a count of the branches of the prediction model 900B. The blocks between two adjacent prediction layers may be connected randomly. An original image including a representation of at least one subject may be input into the plurality of branches of the prediction model 900A. Each branch may output a target positioning result for each of the at least one subject. For example, the branch 910-1 may output an image Q1', the branch 910-2 may output an image Q2', and the branch 910-N may output an image Qn'.

In some embodiments, for each branch of the plurality of branches of the prediction model, the processing device 120 may determine a candidate positioning result (e.g., a candidate image) corresponding to each block of a plurality of blocks of a plurality of prediction layers of the branch by inputting the original image into the prediction model. The processing device 120 may determine a target positioning result (e.g., a target image) corresponding to the branch by processing a plurality of candidate positioning results corresponding to the plurality of blocks. For example, the processing device 120 may determine an average element value (or the maximum element value, the minimum element value) of a plurality of corresponding elements in a plurality of candidate image as a value of a corresponding element in the target image. As used herein, an element of an image refers to a pixel or a voxel of the image.

In 530, the processing device 120 (e.g., the determination module 430) may determine an evaluation result corresponding to the original image based on the plurality of target positioning results.

In some embodiments, the evaluation result may be used to evaluate the accuracy of the plurality of target positioning results. For example, the evaluation result corresponding to the original image may reflect a confidence level of the plurality of target positioning results corresponding to the original image. A higher confidence level may indicate that the plurality of target positioning results determined based on the original image are relatively accurate, and the plurality of target positioning results can be used to guide the medical device to scan the subject. In some embodiments, the evaluation result may be in a form of a continuous value, a discrete value (e.g., a confidence grade), a heat map (e.g., a probability heatmap), or the like, or any combination thereof. The heat map may visualize data in a form of colored map.

In some embodiments, the processing device 120 may determine a plurality of variance maps based on a plurality of heat maps. The processing device 120 may determine a plurality of average values based on the plurality of variance maps. The processing device 120 may determine a Gaussian distribution based on plurality of average values. The processing device 120 may determine the evaluation result based on the Gaussian distribution.

In some embodiments, the processing device 120 may obtain a plurality of original images each of which includes a representation of a subject. For each original image of the plurality of original images, the processing device 120 may generate a plurality of target positioning results (e.g., a plurality of heat maps) for the subject. The processing device 120 may determine a variance map based on a plurality of element values of each heat map of plurality of heat maps. For example, the processing device 120 may determine a variance value of a plurality of corresponding elements in the plurality of heat maps. The plurality of corresponding elements may correspond to a same position in the plurality of heat maps. The processing device 120 may determine the variance map based on a plurality of variance values. The processing device 120 may determine an average value based on the variance map. For example, the processing device 120 may determine the average value of a plurality of elements of the variance map. Further, the processing device 120 may determine a Gaussian distribution based on a plurality of average values corresponding to the plurality of original images. The processing device 120 may determine the evaluation result based on the Gaussian distribution. For example, the processing device 120 may determine a magnitude of the Gaussian distribution as the evaluation result.

In some embodiments, the processing device 120 may determine an evaluation result for each of the plurality of target positioning results. In some embodiments, the processing device 120 may determine a candidate evaluation result for each of the plurality of target positioning results. The processing device 120 may determine a statistics value of a plurality of candidate evaluation results for the plurality of target positioning results as the evaluation result. The statistics value may include an average value, a variance value, a skewness value, a covariance value, or the like.

In some embodiments, the processing device 120 may determine a heat map based on the plurality of target positioning results. For example, the heat map may include a plurality of cells. The color of a cell may reflect a confidence level of the plurality of target positioning results for a corresponding position in the original image. For example, a relatively dark color of a cell may correspond to a relatively high confidence level of the plurality of target positioning results for a corresponding position in the original image. In some embodiments, the heat map may reflect distribution ranges of a plurality of regions with different confidence levels.

In some embodiments, the processing device 120 may determine a confidence grade based on the evaluation result. The confidence grade may include a first confidence grade, a second confidence grade, and a third confidence grade. The confidence levels of the first confidence grade, the second confidence grade, and the third confidence grade may be gradually decreased. For example, if the evaluation result is in a range $[-\sigma, \sigma]$ of the Gaussian distribution, the confidence grade of the evaluation result may be determined as the first confidence grade. If the evaluation result is in a range $(-2\sigma, -\sigma)$ or a range $(\sigma, 2\sigma)$ of the Gaussian distribution, the confidence grade of the evaluation result may be determined as the second confidence grade. If the evaluation result is in other ranges of the Gaussian distribution, the confidence grade of the evaluation result may be determined as the third confidence grade.

In some embodiments, the original image may include a plurality of representations of a plurality of subjects (e.g., a plurality of scan regions of a patient). The processing device 120 may input the original image into the prediction model. Each branch of a plurality of branches of the prediction model may output a target positioning result for each of the plurality of subjects. For each subject of the plurality of subjects, the processing device 120 may determine an evaluation result for the subject based on a plurality of target positioning results for the subject. Accordingly, the processing device 120 may determine a plurality of evaluation results (e.g., QF1, QF2, . . . , QFn) for the plurality of subjects in the original image using the prediction model, which may improve the efficiency of image evaluation.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added in process 500. For example, process 500 may include an additional operation for transmitting the original image, the plurality of target positioning results, and/or the evaluation result to a terminal device (e.g., the terminal 140) for display. In some embodiments, the processing device 120 may perform a preprocessing operation (e.g., a denoising operation, an image enhancement operation) on the original image, and input a preprocessed image into the prediction model. In some embodiments, the processing device 120 may input raw data (e.g., projection data) into the prediction model, and the prediction model may generate the original image based on the raw data, and output the plurality of target positioning results.

Figure 6:
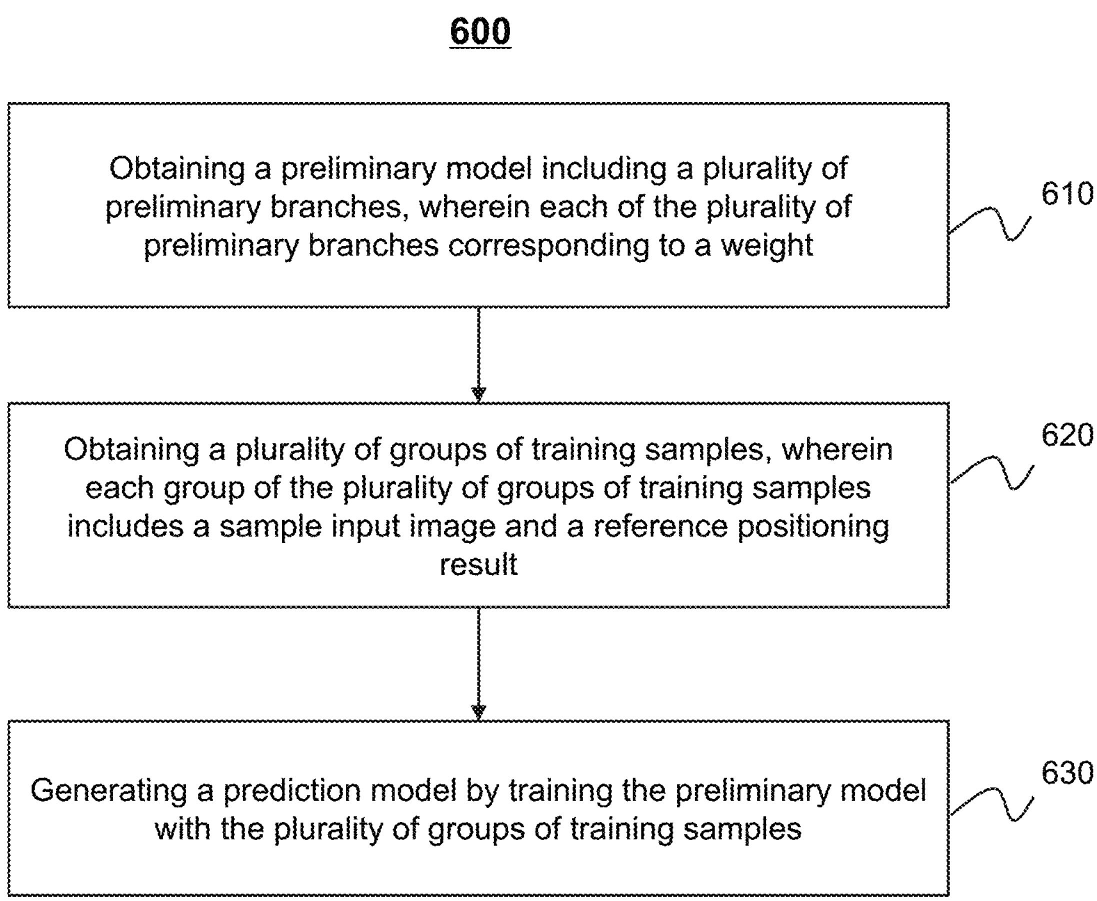
FIG. 6 is a flowchart illustrating an exemplary process for generating a prediction model according to some embodiments of the present disclosure.

FIG. 6 is a flowchart illustrating an exemplary process for generating a prediction model according to some embodiments of the present disclosure. In some embodiments, process 600 may be executed by the medical system 100. For example, the process 600 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting.

In 610, the processing device 120 (e.g., the training module 440) may obtain a preliminary model including a plurality of preliminary branches. Each of the plurality of preliminary branches may correspond to a weight.

As used herein, a preliminary model refers to a machine learning model to be trained. In some embodiments, the processing device 120 may initialize one or more parameter values of one or more parameters in the preliminary model. Exemplary parameters in the preliminary model may include a total count (or number) of preliminary branches, a total count (or number) of prediction layers, a total count (or number) of blocks in each preliminary branch, a weight corresponding to each preliminary branch, a learning rate, a batch size, or the like. In some embodiments, the initialized values of the parameters may be default values determined by the medical system 100 or preset by a user of the medical system 100. In some embodiments, the processing device 120 may obtain the preliminary model from a storage device (e.g., the storage device 130) of the medical system 100 and/or an external storage device via the network 150.

In 620, the processing device 120 (e.g., the training module 440) may obtain a plurality of groups of training samples. Each group of the plurality of groups of training samples may include a sample input image and a reference positioning result.

The plurality of groups of training samples may be used to train the preliminary model. In some embodiments, each group of training samples may include a sample input image and a reference positioning result. In some embodiments, the sample input image may include a CT image, an MRI image, a PET image, a PET-CT image, an MRI-CT image, or the like. The sample input image may include a 2D image, a 3D image, or the like. The sample input image may include a representation of at least one sample subject. For example, the sample input image may be a historical medical image obtained by performing a historical scan on the at least one sample subject. As used herein, a sample subject refers to a subject whose data is used for training the prediction model. In some embodiments, the sample subject may be the same as the subject as described in operation 510.

The reference positioning result may indicate feature information (e.g., a size, a contour, a position) of at least one portion of the at least one sample subject in the sample input image. In some embodiments, a user of the medical system 100 may identify and mark the at least one sample subject in the sample input image to generate the reference positioning result. In some embodiments, the processing device 120 may identify and mark the at least one sample subject in the sample input image according to an image analysis algorithm (e.g., an image segmentation algorithm, a feature point extraction algorithm) to generate the reference positioning result.

In 630, the processing device 120 (e.g., the training module 440) may generate a prediction model by training the preliminary model with the plurality of groups of training samples.

In some embodiments, the processing device 120 may determine the prediction model by training the preliminary model according to an iterative operation including one or more iterations. Taking a current iteration of the one or more iterations as an example, the processing device 120 may obtain an updated preliminary model generated in a previous iteration. The processing device 120 may generate a plurality of sample positioning results by inputting a sample input image of a group of training samples into the updated preliminary model. The processing device 120 may determine a plurality of candidate loss function values corresponding to the plurality of preliminary branches of the updated preliminary model based on the plurality of sample positioning results and the reference positioning result of the group of training samples. The processing device 120 may determine a target loss function value based on the plurality of candidate loss function values and weights corresponding to the plurality of preliminary branches of the updated preliminary model. The processing device 120 may determine whether the target loss function value satisfies a condition. In response to determining that the target loss function value does not satisfy the condition, the processing device 120 may update the updated preliminary model by updating at least some of the parameter values of the updated preliminary model. The processing device 120 may adjust the weights corresponding to the plurality of preliminary branches of the updated preliminary model based on the plurality of candidate loss function values corresponding to the plurality of preliminary branches of the updated preliminary model. In response to determining that the target loss function value satisfies the condition, the processing device 120 may designate the updated preliminary model as the prediction model. More descriptions regarding the generation of the prediction model may be found elsewhere in the present disclosure (e.g., FIG. 7 and descriptions thereof).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the generation, training, and/or updating of the prediction model may be performed on a processing device, while the application of the prediction model may be performed on a different processing device. In some embodiments, the generation and/or updating of the prediction model may be performed on a processing device of a system different from the medical system 100 or a server different from a server including the processing device 120 on which the application of the prediction model is performed. For instance, the generation and/or updating of the prediction model may be performed on a first system of a vendor who provides and/or maintains such a prediction model and/or has access to training samples used to generate the prediction model, while image evaluation based on the provided prediction model may be performed on a second system of a client of the vendor. In some embodiments, the generation and/or updating of the prediction model may be performed on a first processing device of the medical system 100, while the application of the prediction model may be performed on a second processing device of the medical system 100. In some embodiments, the generation and/or updating of the prediction model may be performed online in response to a request for image evaluation. In some embodiments, the generation and/or updating of the prediction model may be performed offline.

In some embodiments, the prediction model may be generated, trained, and/or updated (or maintained) by, e.g., the manufacturer of the medical device 110 or a vendor. For instance, the manufacturer or the vendor may load the prediction model into the medical system 100 or a portion thereof (e.g., the processing device 120) before or during the installation of the medical device 110 and/or the processing device 120, and maintain or update the prediction model from time to time (periodically or not). The maintenance or update may be achieved by installing a program stored on a storage device (e.g., a compact disc, a USB drive) or retrieved from an external source (e.g., a server maintained by the manufacturer or vendor) via the network 150. The program may include a new model (e.g., a new prediction model) or a portion thereof that substitutes or supplements a corresponding portion of the prediction model.

Figure 7:
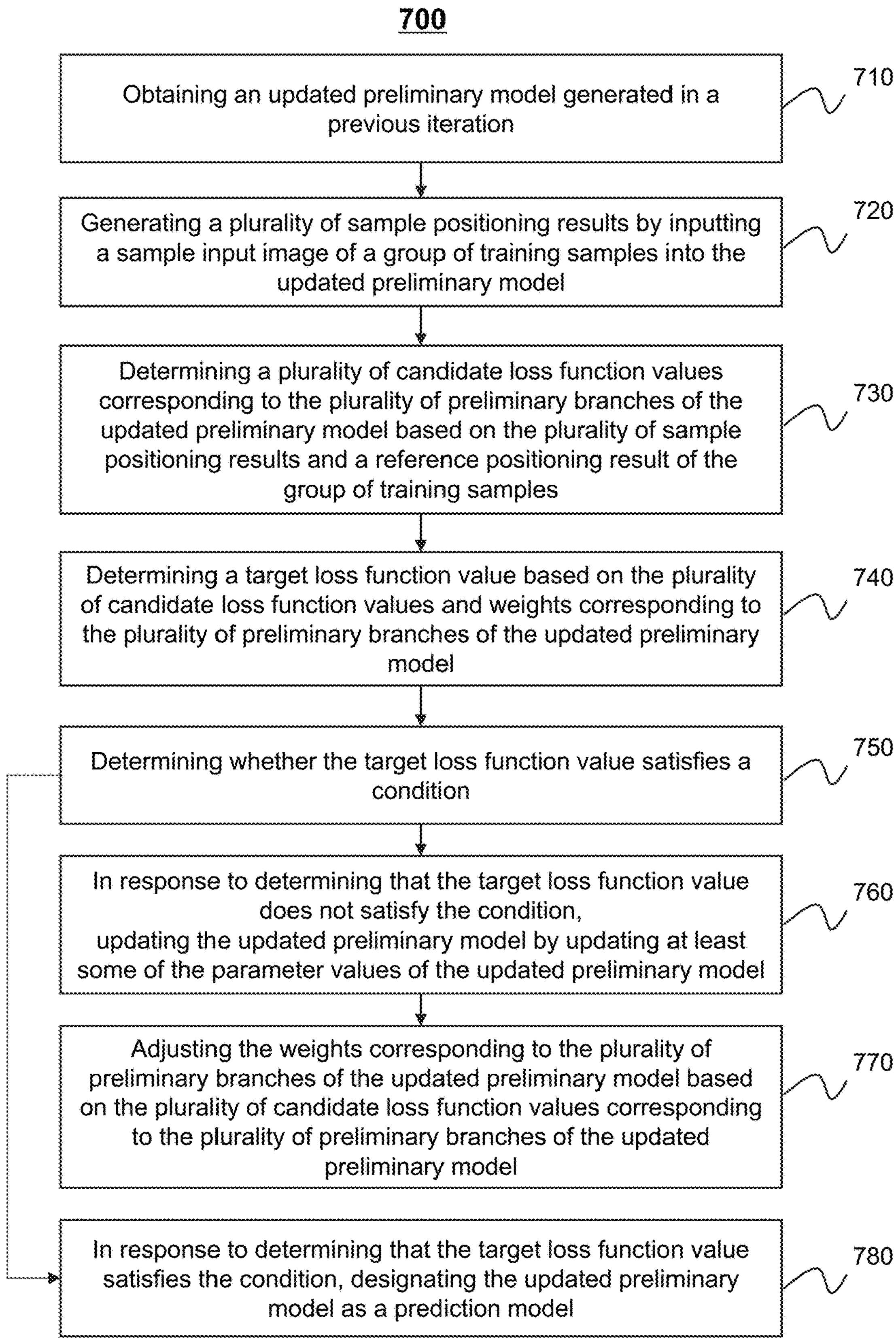
FIG. 7 is a flowchart illustrating an exemplary process for generating a prediction model according to some embodiments of the present disclosure.

FIG. 7 is a flowchart illustrating an exemplary process for generating a prediction model according to some embodiments of the present disclosure. In some embodiments, process 700 may be executed by the medical system 100. For example, the process 700 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7 and described below is not intended to be limiting.

In 710, the processing device 120 (e.g., the training module 440) may obtain an updated preliminary model generated in a previous iteration.

In some embodiments, for the current iteration being a first iteration, the processing device 120 may obtain a preliminary model as described in operation 610. For the current iteration being a subsequent iteration of the first iteration, the processing device 120 may obtain the updated preliminary model generated in the previous iteration.

In 720, the processing device 120 (e.g., the training module 440) may generate a plurality of sample positioning results by inputting a sample input image of a group of training samples into the updated preliminary model.

In some embodiments, the processing device 120 may input the sample input image into the updated preliminary model. The updated preliminary model may output the plurality of sample positioning results. For example, each preliminary branch of the plurality of preliminary branches may output a sample positioning result.

In 730, the processing device 120 (e.g., the training module 440) may determine a plurality of candidate loss function values corresponding to the plurality of preliminary branches of the updated preliminary model based on the plurality of sample positioning results and the reference positioning result of the group of training samples.

In some embodiments, the sample input image may be inputted into an input layer of the updated preliminary model, and the reference positioning result corresponding to the sample input image may be inputted into an output layer of the updated preliminary model as a desired output of the updated preliminary model. The updated preliminary model may extract one or more image features (e.g., a low-level feature (e.g., an edge feature, a texture feature), a high-level feature (e.g., a semantic feature), or a complicated feature (e.g., a deep hierarchical feature) included in the sample input image. For each preliminary branch of the plurality of preliminary branches of the updated preliminary model, the preliminary branch may output a predicted output (i.e., a sample positioning result) of the sample input image based on the extracted image features. A candidate loss function value corresponding the preliminary branch may be determined based on the predicted output (i.e., the sample positioning result) corresponding to the preliminary branch and the desired output (e.g., the reference positioning result) using a loss function. As used herein, a loss function of a model may be configured to assess a difference between a predicted output (e.g., a sample positioning result) of the model and a desired output (e.g., a reference positioning result). For example, the loss function may be a winner-takes-all (WTA) loss function. As used herein, a winner-take-all refers to a computational principle applied in computational models of neural networks by which neurons in a layer compete with each other for activation. For example, only the neuron with the highest activation stays active while all other neurons shut down.

In 740, the processing device 120 (e.g., the training module 440) may determine a target loss function value based on the plurality of candidate loss function values and weights corresponding to the plurality of preliminary branches of the updated preliminary model.

In some embodiments, for each preliminary branch of the plurality of preliminary branches of the updated preliminary model, the processing device 120 may determine a product of a candidate loss function value corresponding to the preliminary branch and the weight corresponding to the preliminary branch. The processing device 120 may determine a sum of a plurality of products corresponding to the plurality of preliminary branches of the updated preliminary model as the target loss function value.

In some embodiments, the processing device 120 may determine a penalty item based on the plurality of sample positioning results corresponding to the plurality of preliminary branches and a count of the plurality of preliminary branches. The penalty item may be used to increase a variability degree (or a confusion degree) of outputs (e.g., the plurality of sample positioning results, the plurality of target positioning results) of a model (e.g., the updated preliminary model, the prediction model). For example, the penalty item may be used to increase differences between outputs (e.g., the plurality of sample positioning results, the plurality of target positioning results) of the model (e.g., the updated preliminary model, the prediction model) during the training of the model, which may improve the accuracy of the determination of the positioning results.

Merely by way of example, the processing device 120 may determine the penalty item according to Equation (1):

$$P = -\frac{1}{N \times I}\Sigma_n^N \Sigma_i^I \Sigma_m^M \left(Q_m(n, i) - \frac{1}{M}\right)^2, \tag{1}$$

wherein P refers to a penalty item; N refers to a count of subjects in an original image; I refers to a count of elements (e.g., pixels, voxels) of each subject in the original image; M refers to a count of preliminary branches of a preliminary model (or an updated preliminary model); and $Q_m(n, i)$ refers to a value of $i^{th}$ element (e.g., pixel, voxel) of $n^{th}$ subject of $m^{th}$ branch obtained after an output (e.g., the plurality of sample positioning results) of the preliminary model (or the updated preliminary model) is processed by a preset model. For example, an image may be obtained by processing the output of the preliminary model (or the updated preliminary model) using the preset model, and $Q_m(n, i)$ may be the value of $i^{th}$ element (e.g., pixel, voxel) of $n^{th}$ subject of $m^{th}$ branch in the image.

Merely by way of example, the processing device 120 may determine $Q_m(n, i)$ according to Equation (2):

$$Q_m(n, i) = \frac{\exp(Q'_m(n, i))}{\Sigma_m \exp(Q'_m(n, i))}, \tag{2}$$

wherein Q' refers to an output (e.g., the plurality of sample positioning results) of a preliminary model (or an updated preliminary model).

Further, the processing device 120 may determine the target loss function value based on the plurality of candidate loss function values, the weights corresponding to the plurality of preliminary branches of the updated preliminary model, and the penalty item. For example, the processing device 120 may determine the target loss function according to Equation (3):

$$\text{loss}=WTA+\lambda\times P, \tag{3}$$

wherein loss refers to a target loss function value; WTA refers to a loss function value determined based on a plurality of candidate loss function values and weights corresponding to a plurality of preliminary branches of a preliminary model (or an updated preliminary model); and P refer to a penalty item. In some embodiments, λ may be less than 1. For example, X may be set as 0.1 or 0.01.

In 750, the processing device 120 (e.g., the training module 440) may determine whether the target loss function value satisfies a condition.

The condition may provide an indication of whether the preliminary model (or the updated preliminary model) is sufficiently trained. The condition may relate to the target loss function value or an iteration count of the iterative process or training process. For example, the condition may be satisfied if the target loss function value associated with the preliminary model (or the updated preliminary model) is minimal or smaller than a threshold (e.g., a constant). As another example, the condition may be satisfied if the target loss function value converges. The convergence may be deemed to have occurred if the variation of the target loss function values in two or more consecutive iterations is smaller than a threshold (e.g., a constant). As still another example, the condition may be satisfied when a specified number (or count) of iterations are performed in the training process.

It should be noted that, in response to a determination that the target loss function value associated with the preliminary model (or the updated preliminary model) is equal to the threshold (e.g., the constant), the processing device 120 may either determine that the condition is satisfied or determine that the condition is not satisfied.

In response to determining that the target loss function value does not satisfy the condition, process 700 may proceed to operation 760. In 760, the processing device 120 (e.g., the training module 440) may update the updated preliminary model by updating at least some of the parameter values of the updated preliminary model In some embodiments, the parameter values of the updated preliminary model may be adjusted and/or updated in order to decrease the target loss function value to smaller than the threshold, and a new updated preliminary model may be generated. Accordingly, in the next iteration, another group of training samples may be input into the new updated preliminary model to train the new updated preliminary model as described above.

In 770, the processing device 120 (e.g., the training module 440) may adjust the weights corresponding to the plurality of preliminary branches of the updated preliminary model based on the plurality of candidate loss function values corresponding to the plurality of preliminary branches of the updated preliminary model.

In some embodiments, as described in connection with operation 610, the processing device 120 may initialize a plurality of weights corresponding to the plurality of preliminary branches of the preliminary model. During the training of the preliminary model, the processing device 120 may adjust the weights corresponding to the plurality of preliminary branches of the updated preliminary model based on the plurality of candidate loss function values corresponding to the plurality of preliminary branches of the updated preliminary model. For example, the processing device 120 may assign the maximum weight of the plurality of weights to a preliminary branch with the smallest candidate loss function value. That is, during the training of the preliminary model, values of the plurality of weights may not be changed, but the preliminary branch with the smallest candidate loss function value may be changed in each iteration.

For illustration purposes, the updated preliminary model may include M preliminary branches. The processing device 120 may determine a weight corresponding to a preliminary branch with the smallest candidate loss function value as 0.95. The processing device 120 may determine a weight corresponding to each preliminary branch of other preliminary branches of the updated preliminary model as 0.05/(M−1).

In response to determining that the target loss function value satisfies the condition, process 700 may proceed to operation 780. In 780, the processing device 120 (e.g., the training module 440) may designate the updated preliminary model as the prediction model. For example, parameter values of the updated preliminary model may be designated as parameter values of the prediction model.

According to some embodiments of the present disclosure, the target loss function value may be determined based on the plurality of candidate loss function values, the weights corresponding to the plurality of preliminary branches of the updated preliminary model and the penalty item, which may increase a variability degree (or confusion degree) of outputs (e.g., the plurality of sample positioning results, the plurality of target positioning results) of a model (e.g., the updated preliminary model, the prediction model). Therefore, the accuracy of the target positioning results outputted by the prediction model may be improved. In addition, the convolution operation of the prediction model may be complete and cannot destroy the continuity and integrity of the spatial structure of an image (e.g., the plurality of target positioning results).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8:
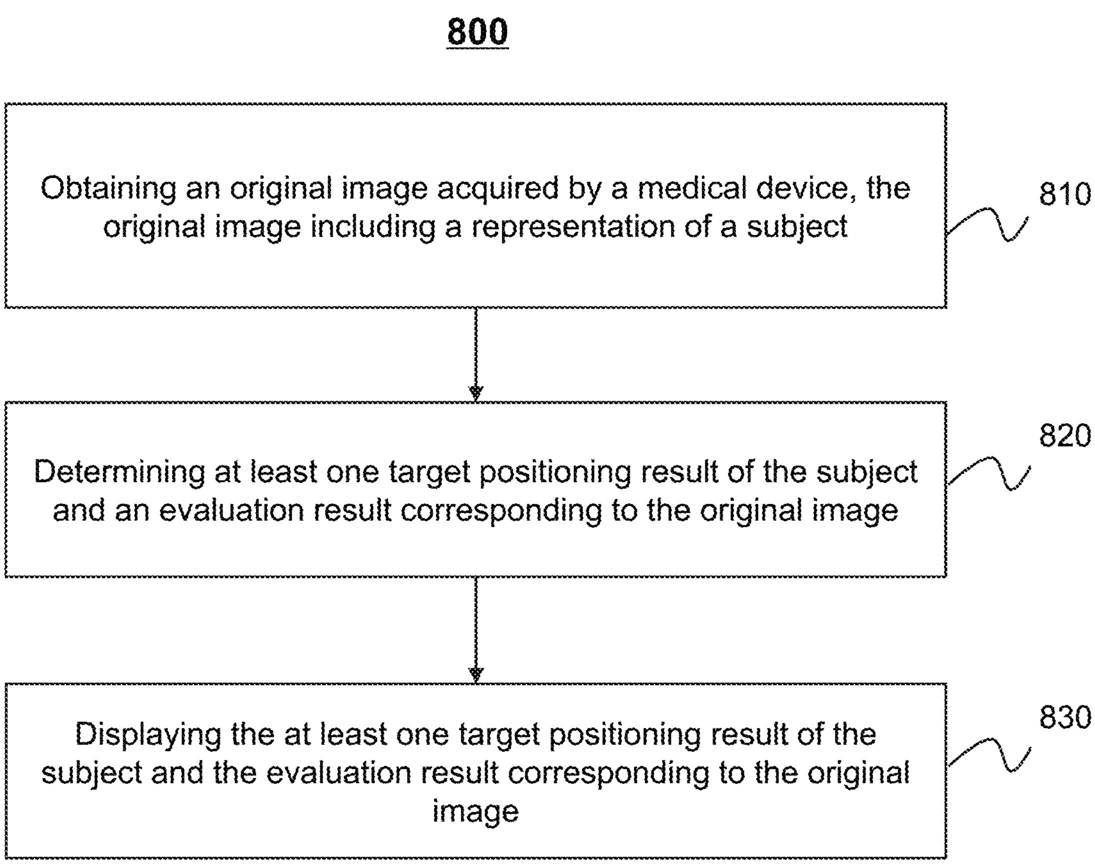
FIG. 8 is a flowchart illustrating an exemplary process for medical imaging according to some embodiments of the present disclosure.

FIG. 8 is a flowchart illustrating an exemplary process for medical imaging according to some embodiments of the present disclosure. In some embodiments, process 800 may be executed by the medical system 100. For example, the process 800 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 800. The operations of the illustrated process presented below are intended to be illustrative. In some embodiments, the process 800 may be accomplished with one or more additional operations not described and/or without one or more of the operations discussed. Additionally, the order of the operations of process 800 illustrated in FIG. 8 and described below is not intended to be limiting.

In 810, the processing device 120 (e.g., the obtaining module 410) may obtain an original image acquired by a medical device. The original image may include a representation of a subject.

Operation 810 may be performed in a similar manner as operation 510 as described in connection with FIG. 5, the descriptions of which are not repeated here.

In 820, the processing device 120 (e.g., the generation module 420, the determination module 430) may determine at least one target positioning result of the subject and an evaluation result corresponding to the original image.

Operation 820 may be performed in a similar manner as operation 520 and operation 530 as described in connection with FIG. 5, the descriptions of which are not repeated here.

In 830, the processing device 120 (e.g., the determination module 430) may display the at least one target positioning result of the subject and the evaluation result corresponding to the original image.

Figure 11:
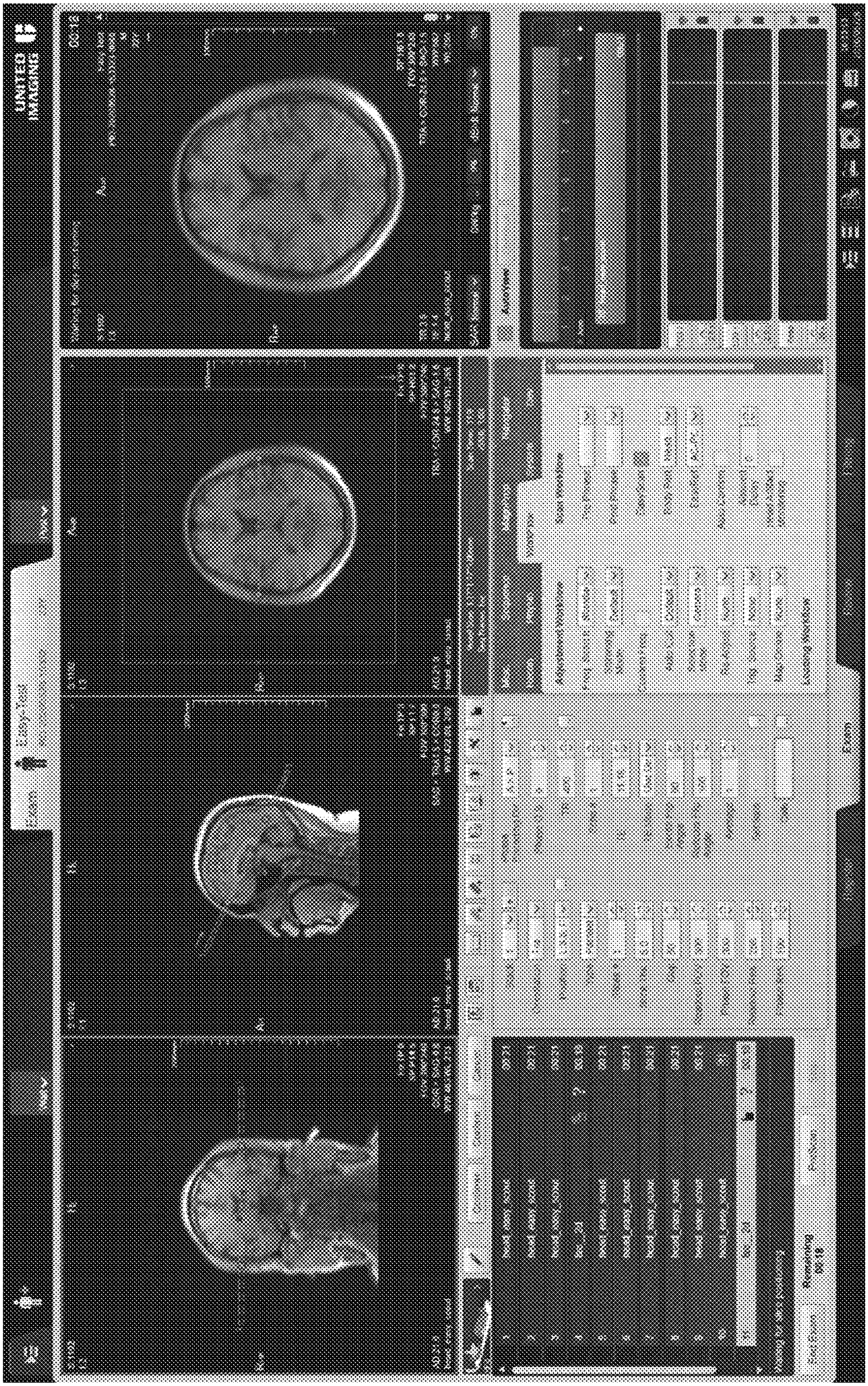
FIG. 11 is a schematic diagram illustrating an exemplary interface of a terminal device according to some embodiments of the present disclosure.

In some embodiments, the processing device 120 may transmit the original image, the at least one target positioning result of the subject, and/or the evaluation result corresponding to the original image to a terminal device (e.g., the terminal 140) for display. For example, an interface of the terminal device may display the original image, the at least one target positioning result of the subject and the evaluation result, as illustrated in FIG. 11. A user may correct and/confirm the at least one target positioning result on the terminal device (e.g., the terminal 140).

In some embodiments, the processing device 120 may determine whether the evaluation result satisfies a condition. For example, the processing device 120 may determine whether the evaluation result (e.g., a confidence level) is greater than a confidence level threshold. The confidence level threshold may be manually set by a user of the medical system 100, or determined by one or more components of the medical device 110. In response to determining that the evaluation result (e.g., the confidence level) is greater than the confidence level threshold, it may indicate that the at least one target positioning result is accurate, and the processing device 120 may determine that the evaluation result satisfies the condition. In response to determining that the evaluation result satisfies the condition, the processing device 120 may generate scanning control information of the subject based on the at least one target positioning result. The scanning control information may be used to guide the medical device to scan the subject. For example, the scanning control information may include a scan range, a scan direction, a scan position, a scan field of view (FOV), or the like, or any combination thereof. In some embodiments, the processing device 120 may generate a scan coordinate system of the subject based on the at least one target positioning result of the subject. The processing device 120 may determine the scanning control information based on the scan coordinate system. More descriptions for generating the scan coordinate system may be found elsewhere in the present disclosure (e.g., FIG. 10 and descriptions thereof).

In some embodiments, in response to determining that the evaluation result satisfies the condition, the processing device 120 may confirm the at least one target positioning result automatically, which may reduce user operation and improve the efficiency of image processing.

In response to determining that the evaluation result does not satisfy the condition, it may indicate that the at least one target positioning result is inaccurate, and the processing device 120 may generate a reminder. The reminder may be in the form of text, voice, a picture, a video, a haptic alert, or the like, or any combination thereof. The processing device 120 may transmit the original image, the at least one target positioning result of the subject, and/or the evaluation result to the terminal device (e.g., the terminal 140) for display. The processing device 120 may receive correction information associated with the at least one target positioning result from a user. In some embodiments, the correction information may include an offset (e.g., a position offset) of at least one target positioning result. In some embodiments, the at least one target positioning result may include a point, a line, a plane, or a bounding box for positioning the subject in the original image. The user may correct the target positioning result by adjusting a position of at least a portion of the point, the line, the plane, or the bounding box in the original image displayed on the terminal device (e.g., the interface of the terminal device) via an input component of the terminal device (e.g., a mouse, a touch screen). For example, the user may adjust a position and/or a size of a bounding box enclosing the subject on the original image to correct the target positioning result of the subject. The processing device 120 may generate the scanning control information of the subject based on the correction information and the at least one target positioning result.

In some embodiments, the processing device 120 may determine whether the evaluation result (e.g., a confidence level) is less than a first risk threshold. The first risk threshold may be used to evaluate the degree of accuracy of the at least one target positioning result. In response to detemrining that the evaluation result is less than the first risk threshold, it may indicate that a degree of accuracy of the at least one target positioning result is relatively high, the processing device 120 may confirm the at least one target positioning result automatically. The processing device 120 may generate the scanning control information of the subject based on the at least one target positioning result. In some embodiments, the processing device 120 may transmit the at least one target positioning result and the evaluation result to the terminal device (e.g., the terminal 140) for display. The user may confirm or correct the at least one target positioning result on the terminal device (e.g., the terminal 140).

In some embodiments, in response to detemrining that the evaluation result is greater than the first risk threshold, it may indicate that a degree of accuracy of the at least one target positioning result is relatively low, the processing device 120 may generate a reminder. The processing device 120 may transmit the original image, the at least one target positioning result, and the evaluation result to the terminal device (e.g., the terminal 140) for display. The processing device 120 may receive correction information associated with the at least one target positioning result from the user. The processing device 20 may generate the scanning control information of the subject based on the correction information and the at least one target positioning result.

For example, in response to detemrining that the evaluation result is greater than the first risk threshold and less than a second risk threshold, it may indicate that a degree of accuracy of the at least one target positioning result is relatively low, and the processing device 120 may transmit the at least one target positioning result and the evaluation result to the terminal device (e.g., the terminal 140) for display. The user may correct the at least one target positioning result on the terminal device (e.g., the terminal 140). As another example, in response to detemrining that the evaluation result is greater than the second risk threshold, it may indicate that the degree of accuracy of the at least one target positioning result is very low, the processing device 120 may generate a reminder. The processing device 120 may transmit the original image to the terminal device (e.g., the terminal 140) for display. The user may determine the target positioning result on the terminal device (e.g., the terminal 140) manually. The first risk threshold and/or the second risk threshold may be manually set by a user of the medical system 100, or determined by one or more components of the medical device 110.

In some embodiments, the processing device 120 may store the correction information corresponding the original image in the at least one storage device (e.g., the storage device 150, an external storage device, a database, a picture archiving and communication (PACS) system). The PACS system may store scan information (e.g., a patient identification, a scan location identification) of a plurality of images of the subject. For example, a plurality of offsets may be stored in the at least one storage device in a form of a matrix. In some embodiments, the processing device 120 may store the scanning control information of the subject in the at least one storage device (e.g., e.g., the storage device 150, an external storage device, a database, a PACS system).

In some embodiments, after the original image is obtained, the processing device 120 may determine whether there is correction information corresponding to the original image. For example, the processing device 120 may determine whether there is the correction information corresponding to the original image stored in at least one storage device (e.g., the storage device 150, an external storage device). In some embodiments, the processing device 120 may obtain historical scan information of the subject (e.g., a scan region of a patient) from the at least one storage device. The processing device 120 may determine whether there is historical correction information in the historical scan information of the subject. In response to determining that there is the correction information corresponding to the original image, the processing device 120 may correct the at least one target positioning result based on the correction information. In response to determining that there is no correction information corresponding to the original image, the processing device 120 may display the at least one target positioning result of the subject and the evaluation result corresponding to the original image.

In some embodiments, after the original image is obtained, the processing device 120 may determine whether there is scanning control information corresponding to the original image. In response to determining that there is the scanning control information corresponding to the original image, the processing device 120 may control the medical device to scan the subject based on the scanning control information.

According to some embodiments of the present disclosure, the original image, the at least one target positioning result of the subject, and/or the evaluation result corresponding to the original image may be displayed on an interface of the terminal device, and the user may correct and/or confirm the at least one target positioning result on the terminal device intuitively.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 820 and 830 may be omitted. After the original image is obtained, in response to determining that there is the correction information corresponding to the original image, the processing device 120 may correct the at least one target positioning result based on the correction information. As another example, an operation for receiving correction information associated with the at least one target positioning result from a user may be added in process 800. As still another example, an operation for generating scanning control information of the subject based on the correction information and the at least one target positioning result may be added in process 800.

FIGS. 10A and 10B are schematic diagrams illustrating exemplary target positioning results for the head of a patient according to some embodiments of the present disclosure.

As illustrated in FIGS. 10A and 10B, the processing device 120 may generate a plane 1010 representing a mid-sagittal plane (MSP) of the head of a patient by inputting an image 1001 into a first prediction model. The processing device 120 may generate an image 1002 based on the plane 1010 representing the MSP. The processing device 120 may generate a point AC representing an anterior commissure point of the head of the patient, and a point PC representing a posterior commissure point of the head of the patient by inputting the image 1002 into a second prediction model. In some embodiments, the processing device 120 may generate a scan coordinate system of the head of the patient based on the plane 1010, the point AC, and the point PC. For example, the processing device 120 may determine a center point of a line connecting the point AC and the point PC as an origin of the scan coordinate system. The processing device 120 may determine a normal vector of the plane 1010 as an X-axis of the scan coordinate system. The processing device 120 may determine a direction of a line connecting the point AC and the point PC as a Y-axis of the scan coordinate system. The processing device 120 may determine a cross product of the Y-axis and the Y-axis vector as a Z-axis of the scan coordinate system. Further, the processing device 120 may determine scanning control information based on the scan coordinate system.

Figure 12A:
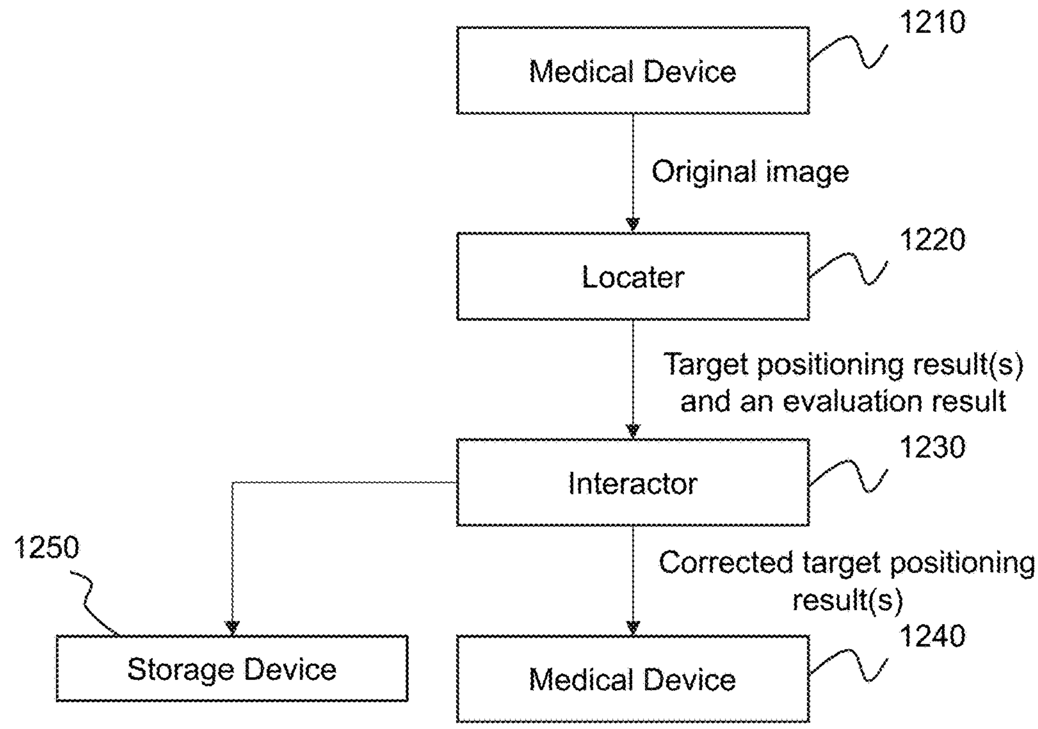
FIG. 12A is a schematic diagram illustrating an exemplary process for scanning a subject according to some embodiments of the present disclosure.

FIG. 12A is a schematic diagram illustrating an exemplary process for scanning a subject according to some embodiments of the present disclosure.

As illustrated in FIG. 12A, an initial scan may be performed on a subject. In operation 1210, a medical device (e.g., an MRI device) may obtain an original image including a representation of at least one subject. In operation 1220, a locater (e.g., a terminal device, a processing device) may generate a plurality of target positioning results for each of the at least one subject by inputting the original image into a prediction model, and determine an evaluation result corresponding to the original image based on the plurality of target positioning results. In operation 1230, an interactor (e.g., an interface of MRI image processing software) may display the plurality of target positioning results and the evaluation result. The interactor may receive a correction instruction for correcting the at least one target positioning result or a confirmation instruction for confirming the at least one target positioning result from a user. The interactor may determine at least one corrected target positioning result based on the correction instruction. The interactor may generate scanning control information of the subject based on the at least one corrected target positioning result. In operation 1240, the medical device may be controlled to scan the subject based on the scanning control information. In 1250, the at least one corrected target positioning result and the scanning control information may be stored in a storage device.

Figure 12B:
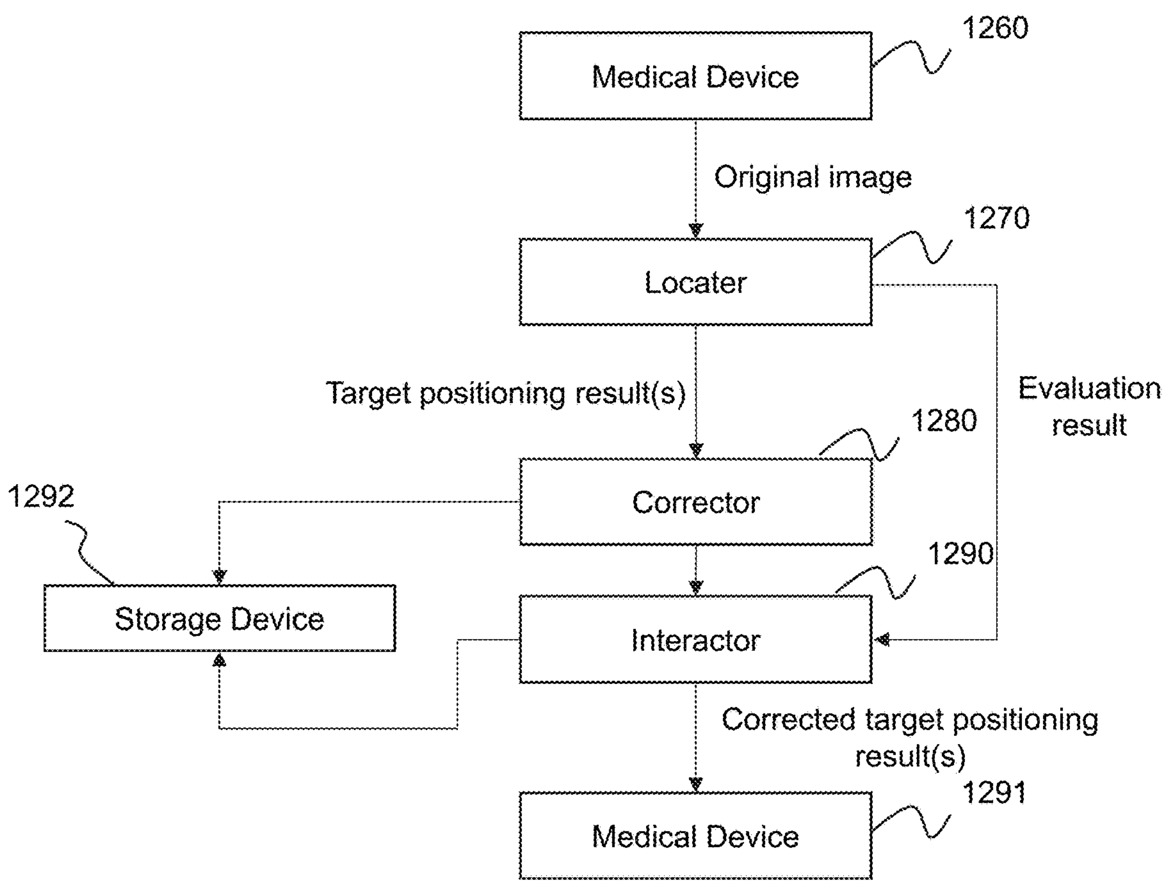
FIG. 12B is a schematic diagram illustrating an exemplary process for scanning a subject according to some embodiments of the present disclosure.

FIG. 12B is a schematic diagram illustrating an exemplary process for scanning a subject according to some embodiments of the present disclosure.

As illustrated in FIG. 12B, a follow-up scan may be performed on a subject. In operation 1260, a medical device (e.g., an MRI device) may obtain an original image including a representation of at least one subject. In operation 1270, a locater (e.g., a terminal device, a processing device) may generate a plurality of target positioning results for each of the at least one subject by inputting the original image into a prediction model, and determine an evaluation result corresponding to the original image based on the plurality of target positioning results. In operation 1280, a corrector (e.g., a processing device) may determine whether there is correction information corresponding to the original image stored in a storage device. In response to determining that there is the correction information corresponding to the original image stored in the storage device, the corrector may correct the at least one target positioning result based on the correction information.

In operation 1290, an interactor (e.g., an interface of MRI image processing software) may display the plurality of target positioning results and the evaluation result. The interactor may receive a correction instruction for correcting the at least one target positioning result or a confirmation instruction for confirming the at least one target positioning result from a user. The interactor may determine at least one corrected target positioning result based on the correction instruction. The interactor may generate scanning control information of the subject based on the at least one corrected target positioning result. In operation 1291, the medical device may be controlled to scan the subject based on the scanning control information. In 1292, the at least one corrected target positioning result and the scanning control information may be stored in a storage device.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms “one embodiment,” “an embodiment,” and “some embodiments” mean that a particular feature, structure or characteristic described in connection with the embodiment is included in at least one embodiment of the present disclosure. Therefore, it is emphasized and should be appreciated that two or more references to “an embodiment” or “one embodiment” or “an alternative embodiment” in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a “module,” “unit,” “component,” “device,” or “system.” Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the “C” programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A method for image evaluation, which is implemented on a computing device including at least one processor and at least one storage device, the method comprising:

obtaining an original image including a representation of at least one subject by scanning the at least one subject with a medical device, wherein each of the at least one subject includes a specific portion of a human or an animal;

generating a plurality of target positioning results for each of the at least one subject by inputting the original image into a prediction model, wherein the prediction model is a multiple hypothesis prediction (MHP) model that includes a plurality of branches, and each of the plurality of target positioning results corresponds to a branch of the plurality of branches, and the prediction model is trained based on a plurality of samples;

determining an evaluation result corresponding to the original image based on the plurality of target positioning results, wherein the evaluation result is used to evaluate an accuracy of the plurality of target positioning results, and the evaluation result corresponding to the original image reflects a confidence level of the plurality of target positioning results corresponding to the original image;

in response to determining that the evaluation result satisfies a first condition, generating scanning control information of the at least one subject based on the plurality of target positioning results; and guiding the medical device to scan at least one of the at least one subject or a portion of one of the at least one subject based on the scanning control information, wherein the scanning control information includes at least one of a scan range, a scan direction, a scan position, or a scan field of view (FOV).

2. The method of claim 1, wherein the prediction model further includes a plurality of prediction layers, each prediction layer of the plurality of prediction layers includes a plurality of blocks, and a count of the plurality of blocks in the each prediction layer is equal to a count of the plurality of branches of the prediction model.

3. The method of claim 2, wherein the generating a plurality of target positioning results for each of the at least one subject by inputting the original image into a prediction model comprises:

for each branch of the plurality of branches, determining a candidate positioning result corresponding to each block of a plurality of blocks of a plurality of prediction layers of the branch by inputting the original image into the prediction model; and determining a target positioning result by processing a plurality of candidate positioning results corresponding to the plurality of blocks.

4. The method of claim 2, wherein the prediction model is generated by a process that includes:

obtaining a preliminary model including a plurality of preliminary branches, wherein each of the plurality of preliminary branches corresponds to a weight;

obtaining a plurality of groups of training samples, wherein each group of the plurality of groups of training samples includes a sample input image and a reference positioning result; and generating the prediction model by training the preliminary model with the plurality of groups of training samples.

5. The method of claim 4, wherein the generating the prediction model by training the preliminary model includes performing an iterative process, and in at least one of one or more iterations in the iterative process, the method further comprises:

obtaining an updated preliminary model generated in a previous iteration;

generating a plurality of sample positioning results by inputting a sample input image of a group of training samples into the updated preliminary model;

determining a plurality of candidate loss function values corresponding to the plurality of preliminary branches of the updated preliminary model based on the plurality of sample positioning results and a reference positioning result of the group of training samples;

determining a target loss function value based on the plurality of candidate loss function values and weights corresponding to the plurality of preliminary branches of the updated preliminary model;

determining whether the target loss function value satisfies a second condition; and in response to determining that the target loss function value does not satisfy the second condition, updating the updated preliminary model by updating at least some of parameter values of the updated preliminary model; and adjusting the weights corresponding to the plurality of preliminary branches of the updated preliminary model based on the plurality of candidate loss function values corresponding to the plurality of preliminary branches of the updated preliminary model.

6. The method of claim 5, further comprising:

in response to determining that the target loss function value satisfies the second condition, designating the updated preliminary model as the prediction model.

7. The method of claim 5, wherein the determining a target loss function value based on the plurality of candidate loss function values and weights corresponding to the plurality of preliminary branches of the updated preliminary model comprises:

determining a penalty item based on the plurality of sample positioning results corresponding to the plurality of preliminary branches and a count of the plurality of preliminary branches; and determining the target loss function value based on the plurality of candidate loss function values, the weights corresponding to the plurality of preliminary branches of the updated preliminary model, and the penalty item.

8. The method of claim 2, wherein at least two blocks between adjacent prediction layers of the prediction model are not connected.

9. The method of claim 1, wherein the target positioning result is a heat map, and the determining an evaluation result corresponding to the original image based on the plurality of target positioning results comprises:

determining a plurality of variance maps based on a plurality of heat maps;

determining a plurality of average values based on the plurality of variance maps;

determining a Gaussian distribution based on the plurality of average values; and determining the evaluation result based on the Gaussian distribution.

10. The method of claim 1, further comprising:

in response to determining that the evaluation result does not satisfy the first condition, generating a reminder;

displaying the original image;

receiving correction information associated with the plurality of target positioning results from a user; and generating scanning control information of each subject of the at least one subject based on the correction information and the plurality of target positioning results.

11. The method of claim 1, further comprising:

determining whether there is correction information corresponding to the original image; and in response to determining that there is the correction information corresponding to the original image, correcting the plurality of target positioning results based on the correction information.

12. The method of claim 1, further comprising:

displaying the plurality of target positioning results of each of the at least one subject and the evaluation result corresponding to the original image.

13. A system for image evaluation, comprising:

at least one storage medium including a set of instructions; and at least one processor in communication with the at least one storage medium, wherein when executing the set of instructions, the at least one processor is directed to cause the system to perform operations comprising:

obtaining an original image including a representation of at least one subject by scanning the at least one subject with a medical device, wherein each of the at least one subject includes a specific portion of a human or an animal;

generating a plurality of target positioning results for each of the at least one subject by inputting the original image into a prediction model, wherein the prediction model is a multiple hypothesis prediction (MHP) model that includes a plurality of branches, and each of the plurality of target positioning results corresponds to a branch of the plurality of branches, and the prediction model is trained based on a plurality of samples;

determining an evaluation result corresponding to the original image based on the plurality of target positioning results, wherein the evaluation result is used to evaluate an accuracy of the plurality of target positioning results, and the evaluation result corresponding to the original image reflects a confidence level of the plurality of target positioning results corresponding to the original image;

in response to determining that the evaluation result satisfies a first condition, generating scanning control information of the at least one subject based on the plurality of target positioning results; and guiding the medical device to scan at least one of the at least one subject or a portion of one of the at least one subject based on the scanning control information, wherein the scanning control information includes at least one of a scan range, a scan direction, a scan position, or a scan field of view (FOV).

14. The system of claim 13, wherein the prediction model further includes a plurality of prediction layers, each prediction layer of the plurality of prediction layers includes a plurality of blocks, and a count of the plurality of blocks in the each prediction layer is equal to a count of the plurality of branches of the prediction model.

15. The system of claim 14, wherein the generating a plurality of target positioning results for each of the at least one subject by inputting the original image into a prediction model comprises:

for each branch of the plurality of branches, determining a candidate positioning result corresponding to each block of a plurality of blocks of a plurality of prediction layers of the branch by inputting the original image into the prediction model; and determining a target positioning result by processing a plurality of candidate positioning results corresponding to the plurality of blocks.

16. The system of claim 14, wherein the prediction model is generated by a process that includes:

obtaining a preliminary model including a plurality of preliminary branches, wherein each of the plurality of preliminary branches corresponds to a weight;

obtaining a plurality of groups of training samples, wherein each group of the plurality of groups of training samples includes a sample input image and a reference positioning result; and generating the prediction model by training the preliminary model with the plurality of groups of training samples.

17. The system of claim 16, wherein the generating the prediction model by training the preliminary model includes performing an iterative process, and in at least one of one or more iterations in the iterative process, the at least one processor is directed to cause the system to perform operations comprising:

obtaining an updated preliminary model generated in a previous iteration;

generating a plurality of sample positioning results by inputting a sample input image of a group of training samples into the updated preliminary model;

determining a plurality of candidate loss function values corresponding to the plurality of preliminary branches of the updated preliminary model based on the plurality of sample positioning results and a reference positioning result of the group of training samples;

determining a target loss function value based on the plurality of candidate loss function values and weights corresponding to the plurality of preliminary branches of the updated preliminary model;

determining whether the target loss function value satisfies a second condition; and in response to determining that the target loss function value does not satisfy the second condition, updating the updated preliminary model by updating at least some of parameter values of the updated preliminary model; and adjusting the weights corresponding to the plurality of preliminary branches of the updated preliminary model based on the plurality of candidate loss function values corresponding to the plurality of preliminary branches of the updated preliminary model.

18. The system of claim 17, wherein the determining a target loss function value based on the plurality of candidate loss function values and weights corresponding to the plurality of preliminary branches of the updated preliminary model comprises:

determining a penalty item based on the plurality of sample positioning results corresponding to the plurality of preliminary branches and a count of the plurality of preliminary branches; and determining the target loss function value based on the plurality of candidate loss function values, the weights corresponding to the plurality of preliminary branches of the updated preliminary model, and the penalty item.

19. The system of claim 13, wherein the target positioning result is a heat map, and the determining an evaluation result corresponding to the original image based on the plurality of target positioning results comprises:

determining a plurality of variance maps based on a plurality of heat maps;

determining a plurality of average values based on the plurality of variance maps;

determining a Gaussian distribution based on the plurality of average values; and determining the evaluation result based on the Gaussian distribution.

20. The system of claim 13, wherein the operations further comprise:

displaying the plurality of target positioning results of each of the at least one subject and the evaluation result corresponding to the original image.

* * * * *